US00RE40412E

(19) United States
(12) Reissued Patent
Cooper

(10) Patent Number: US RE40,412 E
(45) Date of Reissued Patent: Jul. 1, 2008

(54) SYNCHRONIZING SIGNAL SEPARATING APPARATUS AND METHOD

(76) Inventor: J. Carl Cooper, P.O Box 4860, Incline Village, NV (US) 89450

(21) Appl. No.: 10/857,341

(22) Filed: Jun. 1, 2004

Related U.S. Patent Documents

Reissue of:
(64) Patent No.: 5,486,869
Issued: Jan. 23, 1996
Appl. No.: 08/165,688
Filed: Dec. 13, 1993

U.S. Applications:
(63) Continuation of application No. 07/837,323, filed on Feb. 18, 1992, now abandoned.

(51) Int. Cl.
*H04N 5/08* (2006.01)
*H04N 5/10* (2006.01)

(52) U.S. Cl. ..... 348/525; 348/521; 348/529; 348/530; 348/531; 348/E5.017; 375/113; 307/351

(58) Field of Classification Search ..... None
See application file for complete search history.

(56) References Cited

U.S. PATENT DOCUMENTS

| | | | | |
|---|---|---|---|---|
| 3,569,844 | A | 3/1971 | Lynn | 358/153 |
| 3,706,847 | A | 12/1972 | Smeulers | 358/153 |
| 3,819,859 | A | 6/1974 | Borsuk et al. | |
| 4,097,896 | A | 6/1978 | Avery | |
| 4,115,811 | A | 9/1978 | Goff | |
| 4,233,629 | A | 11/1980 | Dayton | |
| 4,298,890 | A | 11/1981 | Lai | 358/153 |
| 4,305,091 | A | 12/1981 | Cooper | |
| 4,313,135 | A | 1/1982 | Cooper | |
| 4,385,319 | A | 5/1983 | Hasegawa | |

(Continued)

FOREIGN PATENT DOCUMENTS

| | | | |
|---|---|---|---|
| GB | 1143241 | 2/1969 | 358/153 |
| GB | 2200011 | 7/1988 | |
| JP | 97274 | 6/1982 | 358/153 |
| JP | 0178669 | 10/1983 | 358/153 |
| JP | 0186270 | 10/1988 | 358/153 |

OTHER PUBLICATIONS

Cooper, J. Carl, "Viewer Stress from Audio/Visual Sync Problems", *SMPTE Journal*, vol. 97, No. 2, pp. 140–142, Feb. 1988.

Cooper, J. Carl, "Video–to–Audio Synchrony Monitoring and Correction", *SMPTE Journal*, vol. 97, No. 2, pp. 695–698, Sep. 1988.

Cooper, J. Carl, "Sine Squared Shaping of Sync and Drive Pulses", *IEEE Transactions on Broadcasting*, vol. 36, No. 2, pp. 162–169, Jun. 1990.

Cooper, J. Carl, "Second generation audio–to–video synchronization", *Broadcast Engineering*, pp. 68–72, Sep. 1995.

(Continued)

*Primary Examiner*—Brian P. Yenke
(74) *Attorney, Agent, or Firm*—Katten Muchin Rosenman LLP

(57) ABSTRACT

The present invention provides a synchronizing signal separation. In accordance with the present invention, a sync pulse processing circuitry slices a video signal and senses the peaks of the synchronizing pulse. A reference generating circuitry divides the output from the sync pulse processing circuitry into a plurality of reference signals that are compared with the video signal, thereby producing logic level outputs. A sync restoring circuitry combines the logic level outputs to provide precisely reconstructed synchronizing pulses of the video signal. The present invention incorporates different standard functions with superior performance because it may be applied for different types of video signals.

72 Claims, 11 Drawing Sheets

U.S. PATENT DOCUMENTS

| | | | | |
|---|---|---|---|---|
| 4,498,141 | A | 2/1985 | Cooper | |
| 4,520,393 | A | 5/1985 | Zwijsen | 358/153 |
| 4,532,541 | A | 7/1985 | Cooper | |
| 4,573,070 | A | 2/1986 | Cooper | |
| 4,665,431 | A | 5/1987 | Cooper | |
| 4,680,633 | A | 7/1987 | Gerdes | |
| 4,703,355 | A | 10/1987 | Cooper | |
| 4,812,907 | A | 3/1989 | Hathaway | 358/153 |
| 4,816,830 | A | 3/1989 | Cooper | |
| 4,829,257 | A | 5/1989 | Cooper | |
| 4,866,543 | A | 9/1989 | Cooper et al. | |
| 4,868,428 | A | 9/1989 | Cooper | |
| 4,872,070 | A | 10/1989 | Cooper et al. | |
| 4,882,624 | A | 11/1989 | Sumiyoshi | |
| RE33,535 | E | 2/1991 | Cooper | |
| 5,097,218 | A | 3/1992 | Cooper | |
| 5,202,761 | A | 4/1993 | Cooper | |
| 5,260,790 | A | 11/1993 | Takayama | |
| 5,424,780 | A | 6/1995 | Cooper | |
| 5,432,559 | A | 7/1995 | Bruins et al. | |
| 5,459,524 | A | 10/1995 | Cooper | |
| 5,486,869 | A | 1/1996 | Cooper | |
| 5,530,483 | A | 6/1996 | Cooper et al. | |
| 5,543,743 | A | 8/1996 | Cooper | |
| 5,548,236 | A | 8/1996 | Cooper et al. | |
| 5,550,594 | A | 8/1996 | Cooper | |
| 5,572,261 | A | 11/1996 | Cooper | |
| 5,592,508 | A | 1/1997 | Cooper | |
| 5,635,725 | A | 6/1997 | Cooper | |
| 5,675,277 | A | 10/1997 | Cooper et al. | |
| 5,675,388 | A | 10/1997 | Cooper | |
| 5,751,368 | A | 5/1998 | Cooper | |
| 5,754,250 | A | 5/1998 | Cooper | |
| 5,793,053 | A | 8/1998 | Cooper | |
| 5,834,747 | A | 11/1998 | Cooper | |
| 5,874,910 | A | 2/1999 | Cooper | |
| 5,920,842 | A | 7/1999 | Cooper et al. | |
| 5,946,049 | A | 8/1999 | Cooper et al. | |
| 5,949,087 | A | 9/1999 | Cooper | |
| 5,996,906 | A | 12/1999 | Cooper | |
| 6,078,038 | A | 6/2000 | Cooper | |
| 6,098,046 | A | 8/2000 | Cooper et al. | |
| 6,141,057 | A | 10/2000 | Cooper et al. | |
| 6,191,407 | B1 | 2/2001 | Cooper | |
| 6,308,890 | B1 | 10/2001 | Cooper | |
| 6,330,033 | B1 | 12/2001 | Cooper | |
| 6,351,281 | B1 | 2/2002 | Cooper | |
| 6,392,707 | B1 | 5/2002 | Cooper et al. | |
| 6,421,636 | B1 | 7/2002 | Cooper et al. | |
| 6,469,741 | B2 | 10/2002 | Cooper et al. | |
| 6,529,637 | B1 | 3/2003 | Cooper | |

OTHER PUBLICATIONS

Complaint by Defendent and Third Party Plaintiff Videotek, Inc. Against Third Party Defendant Gennum Corporation for Breach of Warranty dated Sep. 3, 2002.

Product brochure—DVL 2002 Video Processor—"Maximizing Printer Quality".

Product brochure—DPS–1 by Digital Video Systems—"First in a new advanced class of digital processors!".

Product brochure —DPS–1 by Digital Video Systems—"Setting a new standard for the Industry/The Third Generation Time Base Corrector".

DPS–1 Digital Processing System price list dated Oct. 1978.

Brochure entitled DPS–1 Frame Store dated Mar. 1979.

Promotional Brochure entitled Phaser dated Mar. 1979.

Schematic for an electronic circuit—Digital Video Systems Drawing No. 1DS–5179–1 dated Sep. 21, 1976.

Schematic for circuit design for Digital Video Systems dated 1979.

Enlarged version of Exhibit 388, dated 1979.

Schematic for the 1000GG drawn by Susan Van Nood dated Dec. 2, 1984.

Schematic for IGC 7051—Input Clock Generator—Drawing No. 743H72, Digital Video Systems.

Instruction manual—DTG 1000N Digital Test Generator, Leitch.

Advance Product Information/DTG–1000 Digital Test Generator, Leitch.

Propreitary Information/DTS–2000N Digital Television Scrambler & DTD–2000N Digital Television Descrambler, Preliminary Instruction Manual dated May 26, 1982.

Input Clock Generator (ICG 7051–1) Preliminary Circuit Description and test Procedures—Prepared by Joseph Yu dated Sep. 1977.

Schematic for Sync/Color Bars Generator, Sheet 1 of 6 dated May 30, 1989.

Schematic for Sync/Color Bars Generator, Sheet 2 of 6 dated May 30, 1989.

Schematic for Sync/Color Bars Generator, Sheet 3 of 6 dated May 30, 1989.

Schematic for Sync/Color Bars Generator, Sheet 4 of 6 dated May 30, 1989.

Schematic for Sync/Color Bars Generator, Sheet 5 of 6 dated May 30, 1989.

Schematic for Sync/Color Bars Generator, Sheet 6 of 6 dated May 30, 1989.

Enlargement of Schematic for Sync/Color Bars Generator, Sheet 1 of 66 dated May 30, 1989.

Data Package 9505—Color Black Sync Pulse Generator Module Assembly No.: 066582–00–1977.

Instruction Manual—DPS–1 Operations Manual (Digital Video Systems) dated Nov. 22, 1977.

Instruction Manual—DTG–1000N Digital Test Generator (Leitch Video Limited).

Instruction Manual—DVL 2002 Video Processor Operation and Maintenance Manual (Digital Video Systems) dated Aug. 1976.

LLM1881 Video Sync Separator Application (Preliminary)—National Semiconductor Corporation dated May 1987.

Cooper Rebuttal to Kupnicki Exhibit A–2, undated.

Cooper Rebuttal to Kupnicki Exhibit B–2, undated.

Cooper Rebuttal to Kupnicki Exhibit B–4, undated.

Cooper Rebuttal to Kupnicki Exhibit B–6, undated.

Cooper Rebuttal to Kupnicki Exhibit C–2, undated.

Cooper Rebuttal to Kupnicki Exhibit D–2, undated.

Cooper Rebuttal to Kupnicki Exhibit E–2, undated.

Cooper Rebuttal to Kupnicki Exhibit F–2, undated.

Cooper Rebuttal to Kupnicki Exhibit G–2, undated.

Rebuttal to Kupnicki Exhibit J, undated.

Rebuttal to Kupnicki Exhibit K, undated.

Claim Constructiiion Order dated Nov. 14, 2002.

Confirmation of Notice Pursuant to 35 U.S.C. § 282, dated Dec. 4, 2003.

GS4882, GS4982 Video Sync Separators with 50% Sync Slicing—Data Sheet, undated.

Expert Report of J. Carl Cooper in Rebuttal to the Expert Report of Richard Kupnicki for Defendant Gennum Corporation, dated Aug. 15, 2003.

GS1881, GS4881, GS4981 Monolithic Video Sync Separators—Data Sheet, dated Oct. 1995.
Third–Party Defendant Gennum's Claims Against Plaintiff Technology Licensing Corporation, and Statement of Third–Party Plaintiff's Defenses Against Plaintiff dated Jan. 6, 2003.
Defendant Gennum Corporation's Preliminary Invalidity Contentions for U.S. Patent No. 5,486,869, dated May 16, 2003.
Third–Party Defendant Gennum's First Amended Claims Against Plaintiff Technology Licensing Corporation and Third Party Claim Defendant J. Carl Cooper for: (1) Declaratory Judgement (2) § 443(a) of the Lanham Act (3) Intentional Interference (4) Statutory Unfair Competition (5) Common Law Unfair Competion (6) Trade Libel, dated Oct. 22, 2003.
Gennum's Trial Brief dated Apr. 1, 2004.
Millman, Jacob, Ph.D. and Halkias, Christos C., Ph.D,, *Integrated Electronics: Analog and Digital Circuits and Systems* (McGraw–Hill Book Company, 1972), pp. 99, 100, 568.
Exhibit A–2—Claim Chart Comparing U.S. Patent No. 5,486,869 and U.S. Patent No. 3,819,859, undated.
Digital Video System Input Sync Separator 5179 Circuit Schematic dated 1979.
Exhibit B–2–Claim Chart Comparing U.S. Patent No. 5,486, 869 and Digital Video System Input Sync Separator 5179, undated.
Digital Video Systems Input Clock Generator 7051 Circuit Schematic dated 1981.
Leitch Video Technology 1000GC Circuit Schematic dated 1981.
Exhibit D–2—Claim Chart Comparing U.S. Patent Nos. 5,486,869/5, 754,250 and U.S. Patent No. 4,233,629, undated.
Instruction Manual for Grass Valley Group SCB–200N Sync/Color Bar Generator, pp. 4–1 to 4–7 and Circuit Schematic dated 1989.
Exhibit E–2—Claim Chart Comparing U.S. Patent Nos. 5,486,869/5,754,250 and Grass Valley Group SCB–200N Sync/Color Bar Generator, undated.
National Semiconductor Databook for LM1881, pp. 3–88 to 3–94 dated 1989.
Exhibit F–2—Claim Chart Comparing U.S. Patent Nos. 5,486,869/5,754,250 and National Semiconductor LM1881, undated.
Elantec EL–4581C/EL4583C Video Sync Separator Data Sheet, pp. 4–146 to 4–151, dated 1993.
Plaintiff Technology Licensing Corporation's Opposition To Gennum's Motions For Summary Judgement Of Noninfringement Of U.S. Patent No. 5,486,869 And For Partial Summary Judgement Limiting Any Patent Damages To A Reasonable Royalty Based On Gennum's Revenue for Case No. CV–01–4204 CRB in U.S. District Court for the Northern District of California, San Francisco Division, Nov. 7, 2003.
Addendum To Expert Reports of Richard Kupnicki For Defendant Gennum Corporation for Case No. CV–01–4204 CRB in U.S. District Court for the Northern District of California, San Francisco Division.
Gennum's Opposition To TLC's Renewed Motion To Stay pending the Outcome of Reissue Proceedings for Case No. CV–01–4204 CRB in U.S. District Court for the Northern District of California, San Francisco Division, Sep. 12, 2006.
Declaration of Todd R. Miller In Support of Gennum's Opposition To TLC's renewed Motion To Stay for Case No. CV–01–4204 CRB in U.S. District Court for the Northern District of California, San Francisco Division, Sep. 12, 2006.
Consent Decree And Order for Case No. CV–01–4204 CRB in U.S. District Court for the Northern District of California, San Francisco Division.
Declaration of Richard Kupnicki (II) for Case No. CV–01–4204 CRB in U.S. District Court for the Northern District of California, San Francisco Division, Nov. 7, 2003.
Declaration of Richard Kupnicki for Case No. CV–01–4204 CRB in U.S. District Court for the Northern District of California, San Francisco Division, Nov. 7, 2003.
Gennum's Notice of Motions for Summary Judgement of Noninfringement of U.S. Patent No. 5,486,869 and For Partial Summary Judgement Limiting Any Patent Damages to a Reasonable Royalty Based Upon Gennum's Revenue for Case No. CV–01–4204 CRB in U.S. District Court for the Northern District of California, San Francisco Division, Nov. 7, 2003.
Gennum's Reply in Support of Its Motions for Summary Judgement on Non–Infringement of U.S. Patent No. 5,486, 869, and for Partial Summary Judgement Limiting Any Patent Damages to a Reasonable Royality Based Upon Gennum's Revenue for Case No. CV–01–4204 CRB in U.S. District Court for the Northern District of California, San Francisco Division, Nov. 7, 2003.
Exhibits A–1, A–2, B–1, B–2, B–3, B–4, B–5, B–6, C–1, C–2, D–1, D–2, E–1, E–2, F–1, F–2, G–1, G–2, H–1, H–2, I–1, I–2, J, K, L, M, and N accompanying the Expert Report of Richard Kupnicki for Case CV–01–4204 CRB in U.S. District Court for the Northern District of California, San Francisco Division.
Expert Report Of Richard Kupnicki For Defendant Gennum Corporation for Case CV–01–4204 CRB in U.S. District Court for the Northern District of California, San Francisco Division.
Exhibit J—Claim Chart Comparing U.S. Patent No. 5,486, 869 and U.S. Patent No. 4,233,629, undated.
Exhibit K—Claim Chart Comparing U.S. Patent No. 5,486, 869 and U.S. Patent Nos. 5,560,790, 4,680,633, Digital Video Systems ISS–5179, and National Semiconductor LM1881, undated.
[Proposed] Pretrial Order Mar. 12, 2004.
Expert Report of J. Carl Cooper in Rebuttal to the Expert Report of Richard Kupnicki for Defendant Gennum Corporation dated Aug. 15, 2003, 31 pp.
Revised Joint Claim Coonstruction and Pre–Hearing Statement Pursuant to Patent L.R. 403 dated Sep. 10, 2002.
Plaintiff Technology Licensing Corporation's Opening Brief on Claim Constructions dated Sep. 12, 2002.
Plaintiff Technology Licensing Corporation's Reply Brief on Claim Construction dated Oct. 4, 2002.
Defendant Videotek Inc.'s Brief In Support of Its Proposed Claim Construction dated Sep. 27, 1002.
[Proposed] Claim Construction Order dated Sep. 2002, 17 pages.
Defendant Videotek's Preliminary Invalidity Contentions for U.S. Patent No. 5,486,869 dated May 9, 2002, 17 pages.
Defendant Videotek, Inc.'s Final Invalidity Contentions Under PLR 3–6(b) for U.S. Patent No. 5,486,869 dated Jan. 7, 2003, 31 pages.

Supplemental Confirmation of Notice Pursuant to 35 U.S.C. § 282 dated Mar. 5, 2004, 7 pag.
Gennum's Notice of Motions and Motions for Summary Judgement of Noninfringement of U.S. Patent No. 5,486,869, and for Partial Summary Judgement Limiting Any Patent Damages to a Reasonable Royalty Based on Genum's.
Rebuttal Report of Richard Kupnicki for Defendant Gennum Corporation, undated.
Millman, Jacob and Grabel, Arvin, *Microelectronics* (*Second Edition*), (McGraw–Hill Book Company, 1987), pp. 675–687, 7 pages.
Elantec EL4581 Sync Separator, 50% Slice, S–H, filter Data Sheet dated 2003, 10 pages.
Elantec EL4583 Sync Separator, 50% Slice, S–H, Filter, $H_{oout}$Data Sheet dated 2003, 10 pages.
National Semiconductor LM1881 Video Sync Separator, undated, 8 pages.
Letter to J. Carl Cooper (Technology licensing Corporation) from John Mackie (Gennum Corporation), Jun. 30, 2004.
Sep. 6, 2006 email from Timothy J. Vezeau to J. Donald McCarthy, Mitch Mitchell, and Gloria C. Perez with a copy sent to Michael A. Dorfman, which is attached to a Sep. 6, 2006 email from J. Donald McCarthy to Mitch Mitchell and Gloria C. Perez with a copy sent to Michael A. Dorfman and Timothy J. Vezeau.
[Proposed] order Granting Gennum's Motions for Summary Judgement On The '869 Patent And On The Reasonable Royalty Measure Of Damages for Case No. CV–01–4204 CRB in U.S. District Court for the Northern District of California, San Francisco Division.
Trial Exhibit 295 for Case No. CV–01–4204 CRB in U.S. District Court for the Northern District of California, San Francisco Division, Rebuttal of Invalidity Assertions Re U.S. Patent No. 5,486,869.
Gennum's Notice Of Motions For Summary Judgement Of Noninfringement Of U.S. Patent No. 5,486,869, And For Partial Summary Judgement Limiting Any Patent Damages To A Reasonable Royalty Based On Gennum's Revenue for Case No. CV–01–4204 CRB in U.S. District Court for the Northern District of California, San Francisco Division, Nov. 7, 2003.
*Technology Licensing Corporation*vs. *Gennum Corporation,* Trial Day 1, Oct. 16, 2006, Case No. C–01–4204 RS, Transcript of Proceedings before the Honorable Richard Seeborg, United States Magistrate Judge, in U.S. District Court for the Northern District of California, San Jose Division, vol. 1, pp. 1–241.
*Technology Licensing Corporation*vs. *Gennum Corporation,* Oct. 17, 2006, Morning Session, Case No. C–01–4204 RS, Transcript of proceedings before the Honorable Richard Seeborg, United States Magistrate Judge, in U.S. District Court for the Northern District of California, San Jose Division, vol. 2, pp. 242–355.
*Technology Licensing Corporation*vs. *Gennum Corporation,* Oct. 17, 2006, PM Session, Case No. C–01–4204 RS, Transcript of Proceedings before the Honorable Richard Seeborg, United States Magistrate Judge, in U.S. District Court for the Northern District of California, San Jose Division, vol. 2, pp. 356–454.
*Technology Licensing Corporation*vs. *Gennum Corporation,* Oct. 18, 2006, Case No. C–01–4204 RS, Transcript of Proceedings before the Honorable Richard Seeborg, United States Magistrate Judge, in U.S. District Court for the Northern District of California, San Jose Division, vol 3, pp. 455–716.
*Technology Licensing Corporatiion*vs. *Gennum Corporation,*Oct. 19, 2006, Case No. C–01–4204 RS, Transcript of Proceedings before the Honorable Richard Seeborg, United States Magistrate Judge, in U.S. District Court for the Northern District of California, San Jose Division, vol. 4, pp. 717–980.
*Technology Licensing Corporation*vs. *Gennum Corporation,* Oct. 20, 2006, Case No. C–01–4204 RS, Transcript of Proceedings before the Honorable Richard Seeborg, United States Magistrate Judge, in U.S. District Court for the Northern District of California, San Jose Division, vol. 5, pp. 981–1228.
*Technology Licensing Corporation*vs. *Gennum Corporation,* Oct. 23, 2006, Case C–01–4204 RS, Transcript of Proceedings before the Honorable Richard Seeborg, United States Magistrate Judge, in U.S. District Court for the Northern District of California, San Jose Division, vol. 6, pp. 1229–1454.
*Technology Licensing Corporation*vs. *Gennum Corporation,* Filed Nov. 21, 2006, Document 904, Case No. C 01–4204 RS, "Gennum's Post Trial Brief", Honorable Richard Seeborg–Judge, in U.S. District Coourt for the Northern District of California, San Jose Division, pp. 1–41.
*Technology Licensing Corporation*vs. *Gennum Corporation,* Filed Nov. 21, 2006, Document 905, Case No. C 01–4204 RS, "Gennum's Proposed Findings of Fact and Conclusions of Law", Honorable Richard Seeborg—Judge, in the U.S. District Court for the Northern District of California, San Jose Division, pp. 1–111.
*Technology Licensing Corporation*vs. *Gennum Corporation,* Filed Nov. 21, 2006, Document 906, Case No. CV–01–4204 RS, "Technology Licensing Corporation's Post–Trial Brief", Honorable Richard Seeborg—Judge, in the Northern District of California, San Jose Division, pp. 1–44.
*Technology Licensing Corporation*vs. *Gennum Corporation,* Filed Nov. 21, 2006, Document 907, Case No. CV–01–4204 RS, "Technology Licensing Corporation's Proposed Findings of Fact and Conclusions of Law", Honorable Richard Seeborg, in the U.S. District Court for the Northern District of California, San Jose Division, pp. 1–274.
*Technology Licensing Corporation*v. *Gennum Corporation,* E–Filed May 4, 2007, Document No. 925, Case No. C 01 04204 RS, "Opinion and Order", Honorable Richard Seeborg—Judge, in U.S. District Court for the Northern District of California, San Jose Division, pp. 1–43.
*Technology Licensing Corporation*v. *Gennum Corporation,* E–Filed Jun. 1, 2007, Document No. 931, Case No. C 01–4204 RS, "Judgement", Honorable Richard Seeborg—Judge, in the U.S. District Court for the Northern District of California, San Jose Division, pp. 1–3.
*Technology Licensing Corporation*v. *Gennum Corporation,* E–Filed Jun. 1, 2007, Document No. 930, Case No. C 01–4204 RS, "Order re Entry of Final Judgement", Honorable Richard Seeborg—Judge, in the U.S. District Court for the Northern District of California, San Jose Division, pp. 1–3.
Compilation re: Element c) of Claim 33 of U.S. Patent No. 5,754,250 (one page).
Document entitled "Validity '869 Patent" (26 pages).
Document entitled "Validity '250 Patent" (32 pages).

COMPARATOR
122
126
128
401
402
403
404
405
A1
A2
D1
D2
D3
D4
I7
I8
I9
I10
I11
R38
R39
R40
R41
R42
R43
R44
R45
R46
R47
R48
R49
R50
R51
R52
R53
C15
C16
C17
C18
C19
C20
C21
C22
OP17
OP18
OP19
+5V
R/C
CLR
PR
CS
HS
HQ
YS
FS
SWL
SWT
SWU
VP1
VP2
VP3
VC3

SYNCHRONIZING SIGNAL SEPARATING APPARATUS AND METHOD

Matter enclosed in heavy brackets [ ] appears in the original patent but forms no part of this reissue specification; matter printed in italics indicates the additions made by reissue.

This application is a continuation of application Ser. No. 07/837,323, filed Feb. 18, 1992, now abandoned.

BACKGROUND OF THE INVENTION

The present invention relates to signal processing systems and, in [particularly] *particular*, to video signal processing. A major objective of the present invention is a synchronizing signal processing apparatus and a method that precisely recovers synchronizing signals of a video signal.

Much of modern technology depends on signal processing. A common application of signal processing is for the video signal. Usually, a video signal includes picture synchronizing information. The synchronizing information is transmitted for scanning in a receiver in exact synchronism with a camera-tube scanning. The synchronizing signal must first be recovered from the video signal.

More particularly, TV (Television) video signals, [the] *an* example of the video signal, are processed to obtain desired picture quality. A TV transmitting station modulates video and audio signals and transmits them out by an antenna so that TV receivers may receive them to produce the pictures. In order to precisely reproduce pictures, synchronizing information is added in the video signal so that the receivers can synchronously perform scanning operation as the TV transmitting station does.

Numerical and graphical criteria which describe essential aspects of a TV system[,] *are* employed in the design and operation of equipment to assure that the various parts of the system will operate in cooperative fashion at maximum performance. TV systems have a special need, compared with other communication systems, for definitive standards because television transmitters and receivers must operate in a precise "lock-and-key" relationship. In particular, the scanning of the image in the camera must be matched by the scanning in every associated receiver within a timing precision of approximately one-tenth of a millionth of a second, and with relative positions of picture details correct to a few hundredths of an inch as viewed on the CRT or other display.

To assure that any television receiver can receive programs from any transmitter within range, it is customary to set up a single set of standards with a group of neighboring countries. The TV transmitting stations of different countries and areas transmit video signals with different formats. For example, U.S.A., Canada and Japan et al. use *the* NTSC (National Television System Committee) system. France, Soviet Union et al. use *the* SECAM (Sequential Couleura Memoire) system. Germany and United Kingdom et al. [then] use *the* PAL (Phase Alternation Line) system. Moreover, HDTV (High Definition TV) creates a new system with images of high resolution. For all of these examples, the synchronizing signals added in their video signals are different.

Picture synchronizing information is obtained from the video signal by means of sync separation circuits. In addition, these circuits must separate this information from noise and interference during the reception of weak signals, particularly if impulse noise is present. To reproduce these different video signals of respective systems, different video signal processing devices are needed to provide required synchronizing signals.

Conventional video signal devices for processing the synchronizing information of the video signals can not be used for different standard video signals for providing reliable synchronizing signals, without affecting the reproduction of the video signals or causing high cost of video signal processing. What is needed is a synchronizing signal processing apparatus and method that precisely recovers synchronizing signals of the video signal and can be applied for processing different video signals.

SUMMARY OF THE INVENTION

In accordance with the present invention, a synchronizing signal processing apparatus includes means for sampling synchronizing signals and slicing a video signal in response to the sampled synchronizing signals. The synchronizing signal processing apparatus includes a sampling means that samples the synchronizing signals and provides at least a reference signal. The synchronizing signal processing apparatus also includes a comparing means that slices the video signal in response to the at least a reference signal representing different levels of each of the synchronizing pulses. Thus, the synchronizing signal processing apparatus generates logic level outputs. The video signal with which the present invention is used may be of a standard type having synchronizing pulses including horizontal synchronizing pulses.

The video signal may be sliced, before it is sampled, to eliminate noise. The sliced video signal corresponds to the synchronizing pulses. In response to the sliced video signal, the peaks of the synchronizing pulses of the video signal are precisely sampled. Two sampled signals represent the positive and negative peaks of the synchronizing pulses. The two sampled signals further are divided into three reference signals to compare with the video signal. After this comparison, the logic outputs are combined to recover synchronizing pulses that are reliable, precise and without noise.

A combining means couples to the comparing means so that the outputs from the comparing means are combined depending on the type of the video signal. The combining means generates a plurality of synchronizing signals.

To provide a vertical synchronizing signal, the present invention uses a filtering means that filters one of synchronizing signals output from the combining to provide a vertical synchronizing signal. The filter means shows a good frequency response characteristic for the vertical synchronizing signal.

The synchronizing signal processing method in accordance with the present invention comprises steps of slicing a video signal sampling the video signal in response to respective leading and trailing edges of the sliced signal, converting the sampled signal into at least a reference signal, comparing the reference signal with the video signals and combining the compared outputs to recover synchronizing pulses.

An advantage of the synchronizing signal processing apparatus and method is that the present invention incorporates several standard functions with superior performance. The synchronizing signal processing apparatus in accordance with the present invention is capable of operating with standard two level synchronizing pulses, for example, NTSC, PAL and SECAM type synchronizing pulses, and three level synchronizing pulses, for example HDTV synchronizing pulses. The present invention may also applied for other video type signals with synchronizing pulses.

Furthermore, the present invention provides good bandwidth properties and time constant in the video amplifier section. The combination of the both proper bandwidth and time constant gives considerably noise immunity against high frequency noise, yet maintains sufficient operation speed for high performance. Therefore, no additional compensation or filtering components are needed.

The synchronizing signal processing apparatus in accordance with the present invention may be easily adjusted for either two level or three level synchronizing pulses. The recovered synchronizing levels for video signals are characterized by high precision and reliability.

The logic level outputs of the comparing means are combined, the combination depending on whether the synchronizing pulses are two levels or three levels. In accordance with the present invention, the synchronizing signal processing apparatus may generate a TTL (Transistor-Transistor level) version of the synchronizing pulses.

The synchronizing signal processing apparatus in accordance with the present invention may be used with different video devices, which simplifies the design and manufacture of video devices, and significantly decreases the cost to make these video devices.

Another advantage of the synchronizing signal processing apparatus of the present invention is that it is suitable to be implemented by integrated circuits. Alternatively, the video signal processing can be implemented by software, such as in signal processing application. These and other features and advantages of the present invention are apparent from the description below with reference to the following drawings.

DESCRIPTION OF THE PREFERRED EMBODIMENTS

Figure 1:
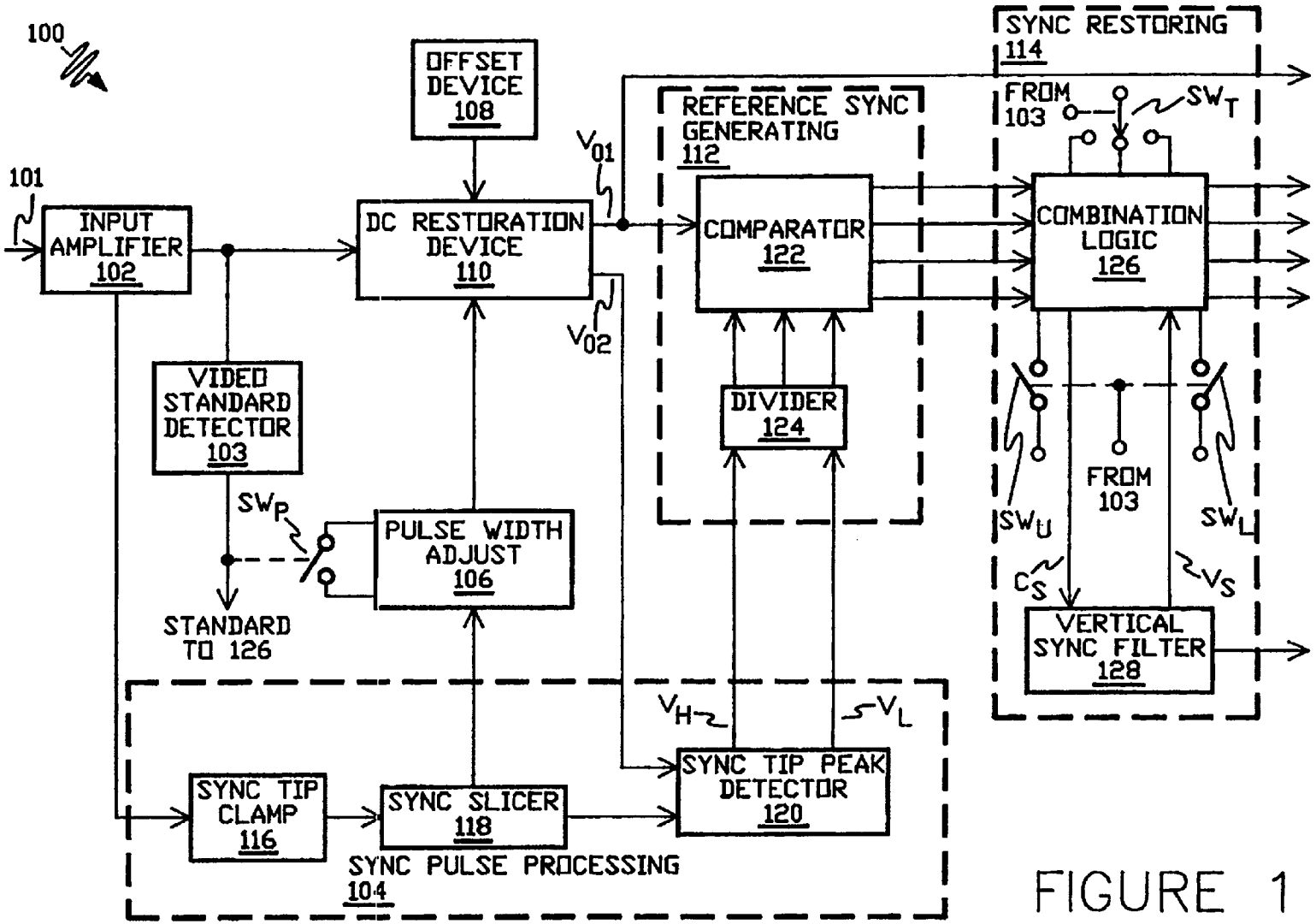
FIG. 1 is a block diagram of a synchronizing signal processing apparatus in accordance with the present invention.

A synchronizing signal processing apparatus 100 in accordance with the present invention includes an input amplifier 102, a video standard detector 103, a sync pulse processing section 104, a pulse width adjust 106, an offset device 108, a DC (Direct Current) restoration device 110, a reference sync generating section 112 and a sync restoring section 114.

Video signal [116] *101* is applied to differential input amplifier 102 where video signal 101 is amplified to improve the ratio of signal/common mode noise. The video signal amplified by input amplifier 102 is fed to sync pulse processing section 104 which includes a sync tip clamp 116, a sync slicer 118 and a sync tip peak [15] detector 120.

The video signal is first clamped by sync tip clamp 116 to generate a clamped signal which has a known DC level of the synchronizing pulses. The clamped signal is then transferred to sync slicer 118 where the clamped signal is sliced, thereby generating a signal that has the same time period as that of the synchronizing pulses but at standard levels as compared to that of the synchronizing pulses, in this example TTL levels. To effectively eliminate interference and noise, the sync slicer 118 slices the synchronizing pulses at a known level which is preferred to be about half of the nominal expected amplitude of the synchronizing pulses. Due to the a known level which is approximately half the expected level, the operation of sync slicer 118 may be considered a coarse slicing operation which provides coarse sliced pulses. The sliced signal is coupled to sync tip peak detector 120, in which peaks of synchronizing pulses of the video signal from DC restoration device 110 are sampled in response to the sliced signal.

The clamped signal is also delivered to pulse width adjust 106. This clamped signal activates pulse width adjust 106 to generate a pulse trigger signal coupling to DC restoration device 110. The pulse trigger signal determines the pulse width of the synchronizing pulses. A switch $SW_P$ is provided with pulse width adjust 106. Changing the status of the switch $SW_P$ may adjust the width of the pulse trigger signal.

The video standard detector 103 is provided for determining the video signal output from the input amplifier 102. When the video signal, for example, is a NTSC video signal, video standard detector 103 controls switch $SW_L$, so that this switch is open, which indicates that the video signal is a NTSC TV signal. On the other hand, when the video signal output from the input amplifier 102 is a HDTV signal, the video standard detector 103 will turn switch $SW_P$ on. The video standard detector 103 also control switches $SW_T$, $SW_U$ and $SW_L$. The switches may be operated automatically in response to a video standard detector 103 which detects the type of signal 101. Therefore, the synchronizing signal processing apparatus 100 in accordance with the present invention may process different video signals.

Offset device 108 provides a DC reference for DC restoration 110. The amplified video signal from the input amplifier 102 is also coupled to DC restoration 110. In response to the reference from offset device 108, DC restoration 110 clamps the amplified video signal to eliminate DC shift and residual common mode noise.

Other types of DC restoration circuits may be used as is well known in the art. It is desired to have the video signal $V_{O1}$ and $V_{O2}$ restored to a known value. However, it should be noted that the DC restoration device 110 may be eliminated by directly AC coupling the video signal output from the input amplifier 102 to the reference sync generating section 112 and sync pulse processing section 104. The operation of sync tip peak detector 120 will track the variations in the AC coupled video signal output from the input amplifier 102 and allow the comparator 122 to function properly. However, the use of a DC restoration device is preferred.

The DC restoration device 110 produces two output signals $V_{O1}$ and $V_{O2}$. The clamped video signal $V_{O2}$ is delivered to sync tip peak detector 120. In response to the sliced signal from the sync slicer 118, sync tip peak detector 120 samples the positive and negative peaks of synchronizing pulses of the clamped video signal so as to provide two peak sample pulse signals. For [purpose] *purposes* of the present example, video is described with respect to positive white with the negative level of sync being that which is farthest from peak white video and the positive level of sync being that which is closest to the peak white value of the video. For two level sync, such as NTSC, the positive peak will correspond to video blanking level. The two peak sample pulse signals define each of *the* synchronizing [pulse] *pulses*. Divider 124 receives them and converts them into three pulse reference signals. The amplitudes of the pulse reference signals represent percentage levels of sync of $V_{O2}$ during the respective ones of the peak sample pulses as represented by $V_h$ and $V_l$.

Reference sync generating section 112 also includes a comparator 122. The clamped video signal from DC restoration 110 and three pulse reference signals are coupled to comparator 122. By comparison, comparator 122 outputs four level signals during each synchronizing pulse of the video signal. Due to the use of references which are responsive to the actual level of the sync pulse, the comparator 122 may be considered a precision comparator, which outputs precision sliced pulses. The four level signals represent different amplitudes of each synchronizing pulse as determined by the video sync being greater than none, one, two or three of the pulse reference signals.

A sync restoring section 114, which includes combination logic 126 and vertical sync filter 128, is arranged to receive the output signals from the comparator 122 of reference sync generating section 112. The combination logic 126 is used to combine the four output signals from comparator 122 to recover reliable synchronizing signals. Switches $SW_U$ and $SW_L$ are arranged to control the switching between the HDTV video signal and conventional TV video signals, for example NTSC TV video signal.

The opening of switches $SW_U$ and $SW_L$ indicates that the synchronizing signal processing apparatus operates with conventional video signal. Otherwise, the closing of the switches $SW_U$ and $SW_L$ shows [out] that the apparatus operates with HDTV video signal. The position of another switch $SW_T$ is also related to the video signal being processed by the apparatus in [according] *accordance* with the present invention. Therefore, the apparatus of the present invention is suitable to different video signals by changing status of these switches, which may respond automatically to the video standard detector 103 as well.

The vertical sync filter 128 is coupled to the combination logic 126. A composite synchronizing signal $C_S$ from the combination logic 126 is coupled to it. The vertical sync filter 128 filters the composite synchronizing signal $C_S$ to provide a vertical synchronizing signal $V_S$. The vertical sync filter 128 may respond to *a* composite synchronizing signal from other sections as well, for example from 112.

Figure 2:
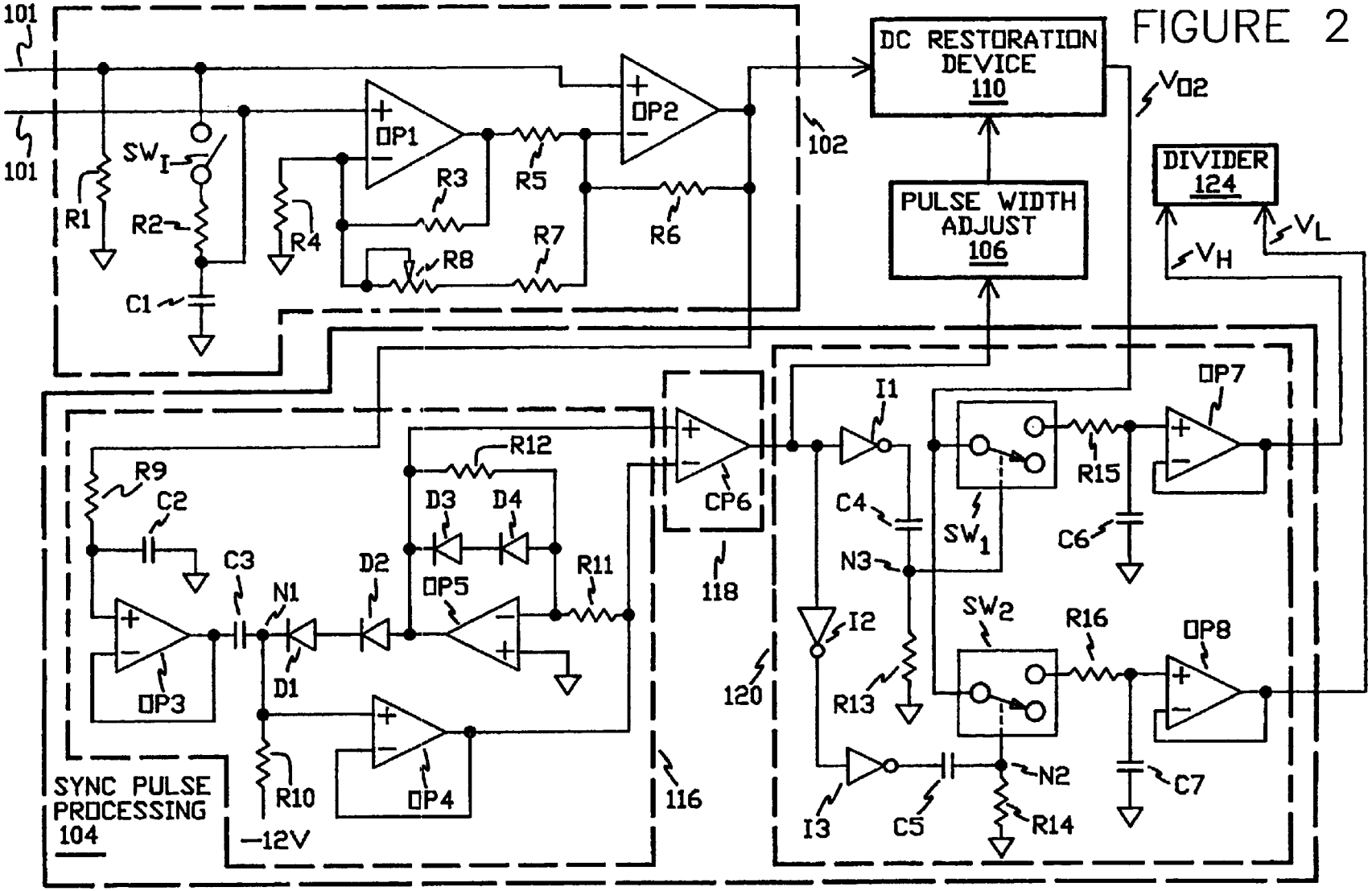
FIG. 2 illustrates a detailed circuit diagram of a sync pulse processing section of the synchronizing signal processing apparatus of FIG. 1.

The sync pulse processing section 104 of synchronizing signal processing apparatus 100 is detailed with reference to FIG. 2. Input amplifier 102 includes two operational amplifiers OP1 and OP2. OP1 is used with OP2 to eliminate common mode noise of the video signal 101. The positive input of OP1 receives one of input video signal 101 which is the common one (shield) of the input signals. Resistor R1, 100 KΩ, is an input resistor for stabilizing the DC component of the input video signal.

A resistor R2 (75 Ω) and a switch $SW_I$ are connected between the input lines for terminating video signal 101. When the input is taken from other than the end of a coaxial cable run, $SW_I$ is open. While the video signal 101 is applied to input amplifier 102 at the end of a coaxial cable run, $SW_L$ is closed so that the input resistance of input amplifier 102 is matching the output resistance of the circuitry providing video signal 101, thereby reducing signal loss. Capacitor C1 (0.1 μf) provides a high frequency bypass from the common to ground. R2 is the terminating resistor (75 Ω). OP1 and resistors R3 (1.10 [k] *K*Ω) and R4 (499 [Ωconstitute] Ω) *constitute* a negative feedback amplifier its gain being two approximately. The output of OP1 is coupled to the negative input of OP2 via resistor R5, 2.21 KΩ.

The positive input of OP2 receives the signal directly from the input signal [116] *101*. OP2 and resistors R6, R7 and potentiometer R8 provide another feedback amplifier. Resistor R6 and R7 have the same resistance, 1.0 KΩ. The potentiometer R8 has a resistance from 0–10 KΩ. Thus, the gain of the input amplifier 102 may be adjusted between 1.5–3. Due to the delay caused by OP1, the common mode component of *input* signal 101 arrives at the positive and negative inputs of OP2 at slightly different moment. Under low frequency, the delay due to OP1 is tolerable. However, high frequency components of the input video signal, after delay by OP1, would severely affect correlation of the common mode signal, causing distortion of *the* video signal. Therefore, a filter having capacitor C1 of 0.01 μf is utilized to filter the interference and noise to ground.

The output of OP2 is coupled to the sync tip clamp 116 of the sync pulse processing section 104. The sync tip clamp 116 includes buffers OP3 and OP4, and an amplifier OP5. Resistor R9 (5.6 KΩ) is used with capacitor C2 to by-pass undesired frequency components. The buffered video signal is coupled to the positive input of another buffer OP4 via an isolating capacitor C3, 0.1 μf. A negative 12 V is applied to the isolating capacitor C3 and the positive input of OP4, via a current limit resistor R10, 147 KΩ. R10 effectively constitutes a constant current source. The isolating capacitor C3 is used to isolate the direct current components of the video signal.

The negative 12 V applied to the capacitor C3 draws node N1 toward a negative level, pulling the video signal output from OP3 to a negative level. The negative video signal, after buffering by buffer OP4, is coupled to the negative input of the amplifier OP5 via a resistor R11 with resistance of 10 KΩ. OP5 and a resistor R12 with resistance of 39 KΩ establishes a negative feedback amplifier. The positive input of OP5 is grounded. The resistance of the resistor R12 determines the maximum gain of amplifier OP5, which may be lowered if D3, D4 conduct.

Normally, the output of OP5 is negative. Two diodes D1 and D2 are provided to isolate the output of OP5 from the node N1. When the output of OP5 is above a level required to turn [the] D1 and D2 on, for example 1.2 V, the capacitor C3 is charged positive. The resistor R10 charges C3 negative, but is countered by the current through D1 and D2 when the video signal is below the ground of the positive input of OP5, thus causing N1 to move in a positive direction, which forces the output signal of OP5 to be returned to a negative value. The other two diodes D3 and D4 are arranged between the negative input and output of OP5. When the video signal at the negative input of OP5 is more positive by a level high enough to turn D3 and D4 on, the negative input and output of OP5 are shorted so that OP5 functions as a buffer and prevents large negative excursions at the output, thereby causing OP5 to recover to normal status very quickly, when returning positive.

Sync slicer 118 includes a comparator CP6. The output of OP5 is directed to the positive input of CP6. The output of OP4 is directed to the negative input of CP6. By comparison of the signals at its inputs, CP6 slices the synchronizing pulses of the video signal at about half of the amplitude. By using both the outputs of OP4 and OP5, the comparison is less sensitive to noise and sync amplitude variations than if a fixed level were used. For the NTSC and HDTV video signals, the output of CP6 has a delay *of* about 0.1 μs. Comparator CP6 slices the amplitude of the synchronizing pulses without appreciable change of pulse width.

The sliced pulses output from CP6 are directed to the sync tip peak detector 120. The sync tip peak detector 120 includes sample switches $SW_1$ and $SW_2$, and two sample holders consisting *of* resistors R15 and R16 with the same resistance of 1 KΩ, and capacitors C6 and C7 with the same capacitance of 0.1 μf. Resistor R15, capacitor C6 and switch $SW_1$ constitute a sample and hold circuit. Resistor R16 and capacitor C7 and $SW_2$ constitute another sample and hold circuit. Two buffers OP7 and OP8 are respectively coupled to the two sample and hold circuits to output the sampled signals.

The sliced pulses from CP6 are first inverted by an invertor I1. Thus, the rising edge of the inverted pulses coincide with the trailing edge of the output pulses of CP6. Each of the inverted pulses is then differentiated at its rising edges, by means of a differential capacitor C4 of 0.001 μf and a differential resistor R13 of 330Ω. The switch $SW_1$ is in the receipt of the signal $V_{O2}$ output from the DC restoration device 110. Usually, switch $SW_1$ is tied to ground via resistor R13. Only upon the arrival of the rising edges of the inverted pulses, switch $SW_1$ is activated to couple to the hold circuit having R15 and C6. Therefore, corresponding to each falling edge of the sliced pulses output from CP6, R15 and C6 sample the positive peaks of the pulses. Note that the sliced sync from CP6 is opposite in polarity to the sync of $V_{O2}$. The sampled positive peak is held for the buffer OP7 to output. The width of *the* differential pulse for sampling the video signal is set by C4 and R13.

Similarly, after inversion twice by invertors I2 and I3, the output of CP6 is differentiated by a differential capacitor C5 of 0.001 μf and a [different] *differential* resistor R14 of 330Ω. Thus a differential pulse is coupled to switch $SW_2$. The differential pulses produced by C5 and R14 cause the switch $SW_2$ *to* close so that a resistor R16 of 1 KΩ and a capacitor C7 of 0.1 μf hold the negative peaks of the synchronizing pulses. The two signals which operate sample switches [SW1] $SW_1$ and [SW2] $SW_2$ can be described as reference taking signals, since they take the instant samples which are in turn held by the hold capacitors to generate the voltage reference signals used by the divider 124 to provide reference for comparator 122.

Figure 5:
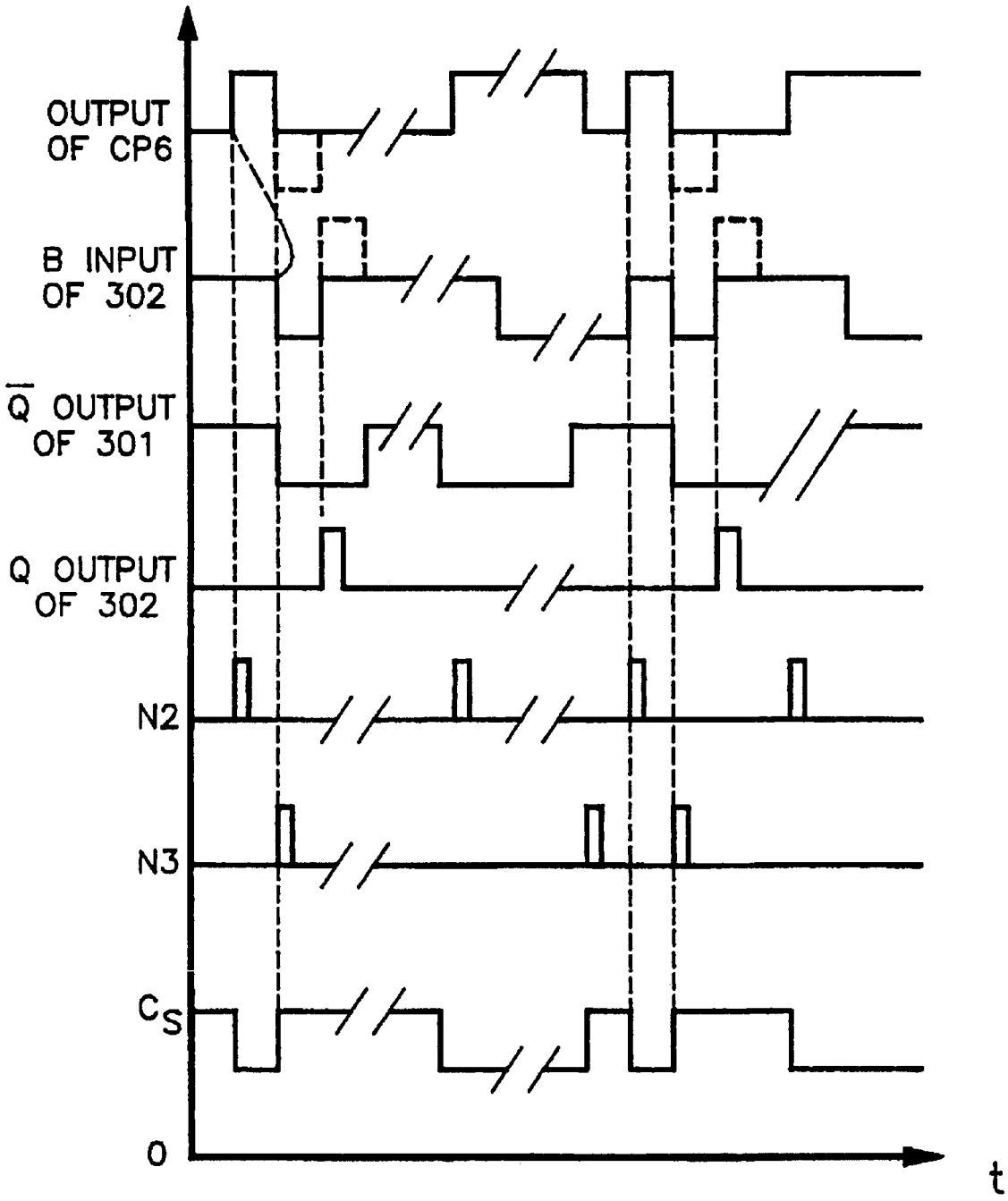
FIG. 5 shows waveform diagrams of several nodes of the synchronizing signal processing apparatus.

As a result, each of the pair of differential pulses produced by C4, R13, C5 and R14 defines the pulse position of respective synchronizing pulses. The relationship of the output pulses of CP6 and the differential pulses is shown in FIG. 5. Furthermore, buffers OP7 and OP8 deliver the peak sample signals to divider 124 for further processing.

Figure 3:
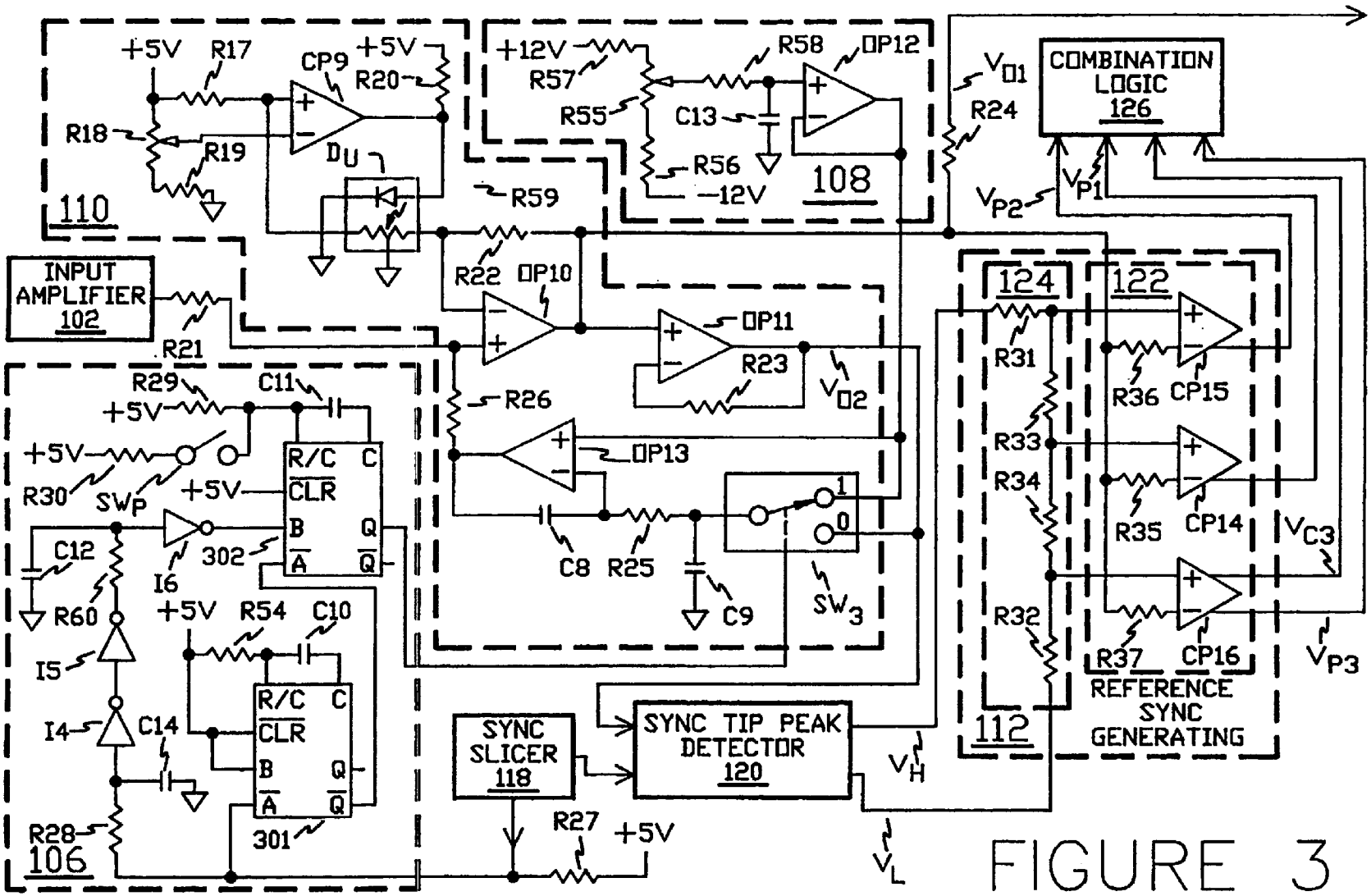
FIG. 3 illustrates a detailed circuit diagram including a pulse width adjust and a reference sync generating section of the synchronizing signal processing apparatus of FIG. 1.

The video signal amplified by the input amplifier 102 is also coupled to the DC restoration device 110, referring to FIG. 3. The DC restoration device 110 includes a voltage comparator CP9, a photosensitive element having a LED (light-emitting diode) $D_u$ and a photoresistor R59, an [amplifiers] *amplifier* OP10 and a buffer OP11. A positive 5 V DC voltage is tied to a resistor R17 or 1.0 KΩ, the left part of the photoresistor R59 and the tap of [R16] *R59* is connected to ground. Thus, the voltage applied to the positive input of the CP9 depends on the resistance of left part of R59. On the other hand, the positive 5 V is tied to a series connection of potentiometer R18 and a resistor R19 and to ground. Thus, the reference voltage at the negative input of CP9 is defined by the position of the wiper of potentiometer R18. Therefore, adjusting the position of the wiper of potentiometer R18 may change the input voltage at the negative input of CP9.

At the output of CP9, a positive 5 V is applied to the LED Du through a resistor R20 of 200Ω. The positive 5 V provides an offset current to LED $D_u$. The light intensity of the LED Du is in proportion to the current flowing through it. The resistance of photoresistor R59 is inversely proportional to the light intensity. Therefore, the higher the output of CP9, the larger the current through the LED Du, the lower the resistance of the photoresistor R59. The lower resistance of R59 makes the voltage applied to the positive input of CP9 go down, thereby causing the output of CP9 to decrease. CP9 thus causes R59 to maintain the voltage at the positive and negative inputs of CP9 to be equal.

The output of the input amplifier 102 is coupled to the positive input of the amplifier OP10 of DC restoration *device* 110, via a resistor [R1] *R21* of 330Ω. The output of OP10 is tied to the negative input via a feedback resistor R22, 1.0 KΩ and the right part of the photoresistor R59 ties the negative input of OP10 to ground. Because the output of CP9 may change the resistance of R59, the gain of OP10 is also controlled by the output of CP9. Therefore, changing the position of the wiper of potentiometer R18 changes the gain of OP10.

The output of OP10 is applied to the positive input of amplifier OP11. Along with a resistor R23 of 1.0 KΩ, the operational amplifier OP11 buffers the output of OP10. The video signal from buffer OP11 is transferred to the sync tip peak detector 120 where the video signal is sampled in response to the pulses from the sync slicer 118, as shown in FIG. 2. The video signal output amplified by OP10 is also sent out by an output resistor R24, 71.5Ω for other purposes.

An offset device 108 is arranged to provide a DC offset required by the operational amplifier OP13 of the DC restoration *device* 110. The offset device 108 includes a resistor network having a resistor R57 (100 KΩ), a resistor [R57] *R56* (100 Ω) and a potentiometer R55. A positive 12 V is coupled to resistor R57 and a negative 12 V is coupled to resistor [R25] *R56*. A voltage determined by the position of the wiper of potentiometer R55 charges a capacitor *C13* of 0.1 μf via a resistor R58 of 100 KΩ. The level on the capacitor C13 is applied to the positive input of a buffer OP12.

The offset voltage is delivered to an integrator circuit established by a operational amplifier OP 13 and a capacitor C8 (0.1 μf) bridging between the negative input and output of OP13. The positive input of OP13 receives the offset voltage. The offset voltage is also coupled to a switch $SW_3$. The common close status of $SW_3$ couples the offset voltage to the negative input of OP13 via a resistor R25 of 10 KΩ. A capacitor C9 of 0.001 μf is tied between ground and $SW_3$ for filtering undesired frequency components and switching transients.

In accordance with the present invention, the pulse width adjust 106 is provided [for]. The pulse width adjust 106 includes two multivibrators 301 and 302. The output from the sync slicer 118 is coupled to the [A] $\bar{A}$ input of 301, as shown in FIG. 3. A positive 5 V, is tied to the clear input $\overline{Clr}$ *and the B input* of 301. Responding to each falling edge of the sliced signal from sync slicer 118, the multivibrator 301 produces a low level pulse at the $\overline{Q}$ output of 301. The width of the low level pulse is set by a resistor R54 of 10 KΩ and a capacitor C10 of 0.001 μf. The output from 301 is shown in FIG. 5.

The output from sync slicer 118 is also coupled to the B input of multivibrator 302 via a delay circuit. This delay circuit includes two RC filters. A capacitor C14 (51 pf) and a resistor R28 (10 KΩ) form a RC filter and a capacitor C12 (56 pf) and a resistor R60 (2.5 KΩ) provide another one. Two invertors I4 and I5 are arranged between the two RC filters. An invertor I6 is positioned between the B input of 302 and RC filter having C12 and R60. A positive 5 V is applied to R28 via a resistor [R58] *R27* (1 [k] *K*Ω) for providing a DC bias. This delay circuit delays the sliced signal from sync slicer 118 about 0.75 μs to 0.9 μs.

The pulses at the $\overline{Q}$ output of 301 trigger the multivibrator 302 via its $\overline{A}$ input so that the Q output of 302 is at high level. The delayed pulses by the delay circuit is applied to B input of 302, triggering it so that the Q output of 302 is at a high level. The pulse width of output pulse from 302 is set by a resistor R29 of 3.32 KΩ and a capacitor C11 of 0.001 μf, if the apparatus 100 in accordance with the present invention operates under conventional TV video signal mode, for example, the NTSC video signal. When the apparatus 100 operates under the HDTV mode, a resistor R30 of 1 KΩ is shunted with R29 by closing of the switch $SW_p$.

Therefore, the pulse width of Q output of 302 is between 2 μs and 2.5 μs for the NTSC video signal. This pulse occurs during blanking and burst portion of the NTSC video signal. On the other hand, the pulse width of the Q output of 302, for the HDTV video signal, is from 0.5 μs to 0.7 μs. The pulse of Q output of 302 coincides with the blanking portion without exceeding it. The waveform at the Q output of 301 is shown in FIG. 5.

The output pulses at the Q output of 302 activate the $SW_3$ so that the output from OP11 is coupled to the negative input of OP13 via the RC filter having the resistor R25 and the capacitor C9. During the high level of the pulses from 302, the capacitor C8 of the integrator OP13 is charged up and down by the video signal from the buffer OP11 depending on whether it is above or below the reference on the plus input of OP13, drawing the input voltage at the positive input of OP10 up or down. As a result, the output of OP10 is drawn *up* or down. After the Q output of 302 recovers to *a* low level, the switch $SW_3$ is released so that the negative input of the operational amplifier OP13 is coupled to the output of OP12 of the offset device 108. Thus, the [10] output of the operational amplifier OP13 does not change.

The divider 124 of the reference sync generating section 112 includes four resistors R31, R32, R33 and R34. The resistors R31–R34 have the same resistance of 10 KΩ. Therefore, the output potential of the sync tip peak detector 120 is equally divided so that three reference potentials are provided. The first reference potential between the resistors R33 and R34 equals half of the output potential from the sync tip peak detector 120. The second reference potential between the resistors R31 and R33 equals three-fourth of the output level from the sync tip peak detector 120. The third reference potential between the resistors R32 and R34 equals one-fourth of the output level from the sync tip peak detector 120. However, different reference potentials may also be obtained by changing the resistance of resistors R31–R34. Different combination of potentials on the positive inputs of CP14–CP16 can be easily realized.

In accordance with the present invention, the comparator 122 of reference sync generating section 112 includes three comparators CP14, CP15 and CP16. The first reference potential between the resistors R33 and R34 is applied to the positive input of comparator CP14. The second reference potential between the resistors R31 and R33 is applied to the positive input of the comparator CP15. The third reference potential is then applied to the positive input of the comparator CP16. The video signal output $V_{O1}$ from the amplifier OP10 of the DC restoration *device* 110 is coupled to respective negative inputs of three comparators CP14–CP16 via resistor R35, R36 and R37.

As for conventional TV video signals, for example, the NTSC video signal, CP14 compares the first reference potential and the video signal $V_{O1}$ so as to sense the middle levels of the horizontal and vertical synchronizing pulses. The comparator CP15 then senses the video signal $V_{O1}$ in response to the second reference potential and the rest of the video signal $V_{O1}$ is regarded as noise. Because the switch $SW_1$ of sync tip peak detector 120 closes during the blanking-burst period to sample the video signal, the second reference potential is set to a level lower than the blanking level. The switch $SW_2$ of sync tip peak detector 120 closes during the negative synchronizing tip to sample the video signal, the third reference potential is thus set to a level higher than the negative tip. Two complementary outputs $V_{P3}$ and $V_{C3}$ from CP16 are delivered to the combination logic 126.

As a second example, when the apparatus 100 in accordance with the present invention is used for processing the HDTV video signal, the second reference potential represents a value between the blanking and positive peak synchronizing tip for the synchronizing pulses. The rest of the video signal $V_{O1}$ is considered as noise. The first reference potential is set at the middle of the negative and positive synchronizing tip during synchronizing pulses, meaning at the blanking level. The purpose of this comparator CP14 is to sense transition from the negative synchronizing tip to the positive synchronizing tip. The rest of the video signal $V_{O1}$ is considered as noise. The reference potential and the output $V_{P3}$ of CP16 is the same as under the NTSC video signal. Therefore, outputs of comparator 122 are logic levels corresponding to the negative sync for these video signals.

Figure 4:
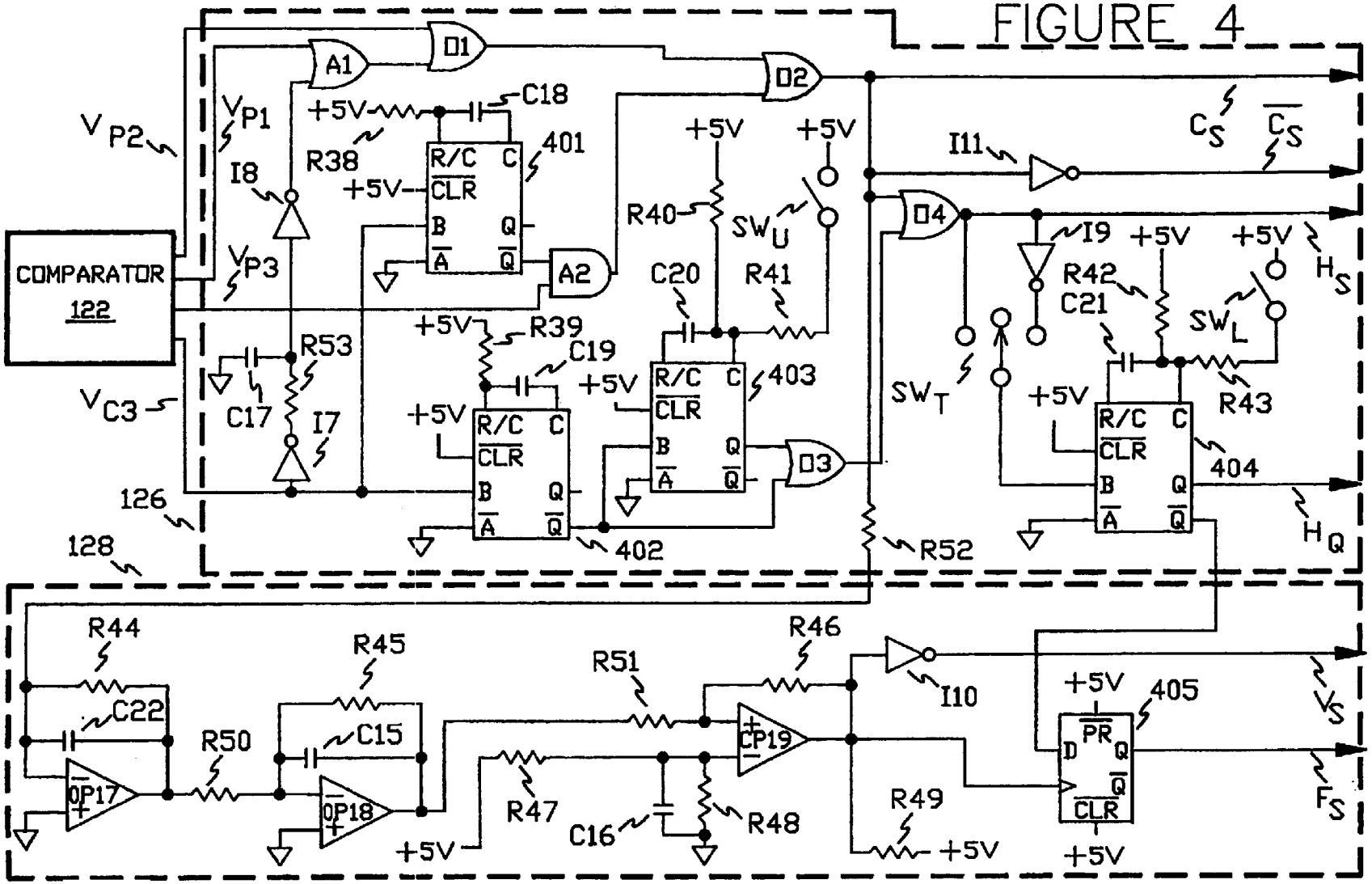
FIG. 4 illustrates a detailed circuit diagram of a sync restoring section of the synchronizing signal processing apparatus of FIG. 1.

The logic level outputs $V_{P1}$, $V_{P2}$, $V_{P3}$ and $V_{C3}$ from the comparator 122 are directed to the combination logic 126 of the sync restoring section 114, as shown in FIG. 4. The output $V_{P1}$ of the comparator CP14 is directed to an input of an AND gate A1. The signal $V_{C3}$ output from the comparator CP16 is inverted by an invertor I7, and is filtered by a RC filer having a resistor R53 (200Ω) and a capacitor C17 (0.001 μf). Before it is applied to another input of the AND gate A1, the filter signal $V_{C3}$ is inverted again by an invertor I8. In order to preserve the combination logic generated sync information at the half way crossing, the output $V_{C3}$ from the comparator CP16 is delayed by the invertor I7 and I8 circuit for 85 ns–200 ns. Thus, the two input pulses are anded at the inputs of the AND gate A1 so that the output of A1 is a positive pulse.

Along with the output from the AND gate A1, the output $V_{P2}$ from the comparator CP15 is directed to an input of an OR gate O1. The positive pulse from A1 and the $V_{P2}$ active the OR gate O1, thereby producing a pulse which has a rising edge defined by the positive pulse from A1 and a falling edge defined by $V_{P2}$. The output of OR gate O1 is directed to another OR gate O2.

The output $V_{C3}$ is also used to trigger a multivibrator 401 so that a high level is set at the $\overline{Q}$ output of the multivibrator 401. The width of *the* high level is set by a resistor R38 and a capacitor [C8] *C18*. In this case [of], *where* capacitor [C8] *C18* has a capacitance of 0.001 μf and resistor R38 has a resistance of 2.9 KΩ, the pulse width is between 1.4 μs–2.8 μs. The output high level at the $\overline{Q}$ output of 401 is directed to an input of an AND gate [35] A2. [The another] *Another* input of A2 receives the output $V_{P3}$ from the comparator CP16. For the NTSC video signal, the output of A2 is determined by signal $V_{P3}$. Under the HDTV video signal, the output of A2 is determined by the pulse at the $\overline{Q}$ output 401. The minimum width for this pulse is 2.6 μs which *is* determined by the duration of the vertical interval pulses. The maximum width for this pulse is 2.8 μs which is determined by the duration of the blanking in horizontal lines.

The ANDed output from A2 is applied to another input of OR gate O2 so that the output from OR gate O1 is ORed with the ANDed output from A2. Particularly, under processing the NTSC video signal, the ORed output of OR gate O1 is completely determined by the ANDed output pulse from A2. The reason is that the negative ANDed output from A2 is narrower than the negative ORed output from O1. The output of O2 is a composite synchronizing output $C_S$.

In order to extract horizontal synchronizing pulses from the output $C_S$ from the OR gate O2, a circuitry including multivibrators 402 and 403, and OR gates O3 and O4 is designed. This circuitry eliminates every second half horizontal pulse from the vertical interval. The signal $V_{C3}$ output from the comparator CP16 is directed to the multivibrator 402, where $V_{C3}$ triggers the B input of 402 to set a low level at its $\overline{Q}$ output. The width of this low level is set by a capacitor C19 (0.001 μf) and a resistor R39 (11.3 KΩ). In this case, the low level lasts 6–10 μs. The 6 μs lower time limit is chosen to be greater than the horizontal synchronizing pulse duration. The upper time limit is chosen so that the pulse will not to get into active video signal.

The $\overline{Q}$ output of 402 triggers the B input of the multivibrator 403 so as to set a high level output at its Q output. The duration of the high level at the Q output of 403 is determined by a capacitor C20 (0.001 μf) and the combination of resistors R40 (68 KΩ) and R41 (50 KΩ). The position of switch $SW_U$ is determined by the operation mode. For example, under the NTSC video signal, $SW_U$ is open so that the duration of the high level at the Q output of 403 is set by R40 and [C12] *C20*, for example 35 μs–50 μs. On the other hand, if the apparatus 100 of the present invention is for processing the HDTV video signal, the switch $SW_U$ is closed so that R41 is shunted across R40. Accordingly, the duration of the high level at the Q output of 403 is determined by C20 and the shunted resistors R40 and R41, for example 17 μs–20 μs.

The Q output of 403, along with the $\overline{Q}$ output of 402, is coupled to inputs of an OR gate O3. The output of OR gate O3 is the OR of the outputs of the both multivibrators 402 and 403. This output of O3 coincides with the synchronizing tip but lasts a little longer. The output of [03] *O3* is directed to an OR gate O4. Another input of the OR gate O4 receives the output from the OR gate O2. The OR gate O4 serves to eliminate the half horizontal pulses during the vertical intervals, thereby producing a horizontal synchronizing output $H_S$.

A multivibrator 404 is used to generate a horizontal square waveform output $H_Q$. The output $H_S$ of the OR gate O4 is coupled to the B input of 404 via the switch $SW_T$. When the apparatus 100 of the present invention operates under the HDTV video signal, the rising edges of output $H_S$ triggers 404 at the B input to set a high level output at its Q output. Meanwhile, the switch $SW_L$ is closed so that the positive 5 V is applied to 404 via shunted resistors R42 and R43 and a capacitor C21. Accordingly, the duration of the high level depends on a capacitor C21 and the resistance of shunted resistors R42 and R43. If the capacitance of C21 is set as 0.001 μf and R42 and R43 are respectively set as 51 KΩ, the duration is then 30 μs.

If the apparatus 100 of the present invention operates with the NTSC video signal, the output $H_S$ is reversed by an invertor [I6] *I9* so that the B input of 404 is triggered by the falling edges of the synchronizing pulse, setting a high level at its Q output. At the same time, the switch $SW_L$ is open so that the positive 5 V voltage is applied to 404 via only a resistor R42. Assuming R42 has the resistance of 51 KΩ and [C31] *C21* has the capacitance of 0.001 μf, the duration of the high level at the Q output of 404 is 30 μs.

The output $C_S$ of OR gate O2 is also directed to a vertical synchronizing filter circuitry including operational amplifiers OP17 and OP18. A resistor R44 of 37.4 KΩ and a capacitor C22 of 0.001 μf bridge across the output and negative input of OP17 to form a first stage low pass filter. The positive input of OP17 is tied to ground. The composite synchronizing output $C_S$ is coupled to the negative input of OP17 via a resistor R52 of 39 KΩ. The output from OP17 is coupled to the negative input of OP18 via a 10 Ω resistor *R50*. The positive input of OP18 is tied to ground. A resistor R45 (10 KΩ) and a capacitor C15 (0.001 μf) are shunted across the negative input and the output of OP18, thereby providing a second stage low pass filter.

Figure 6:
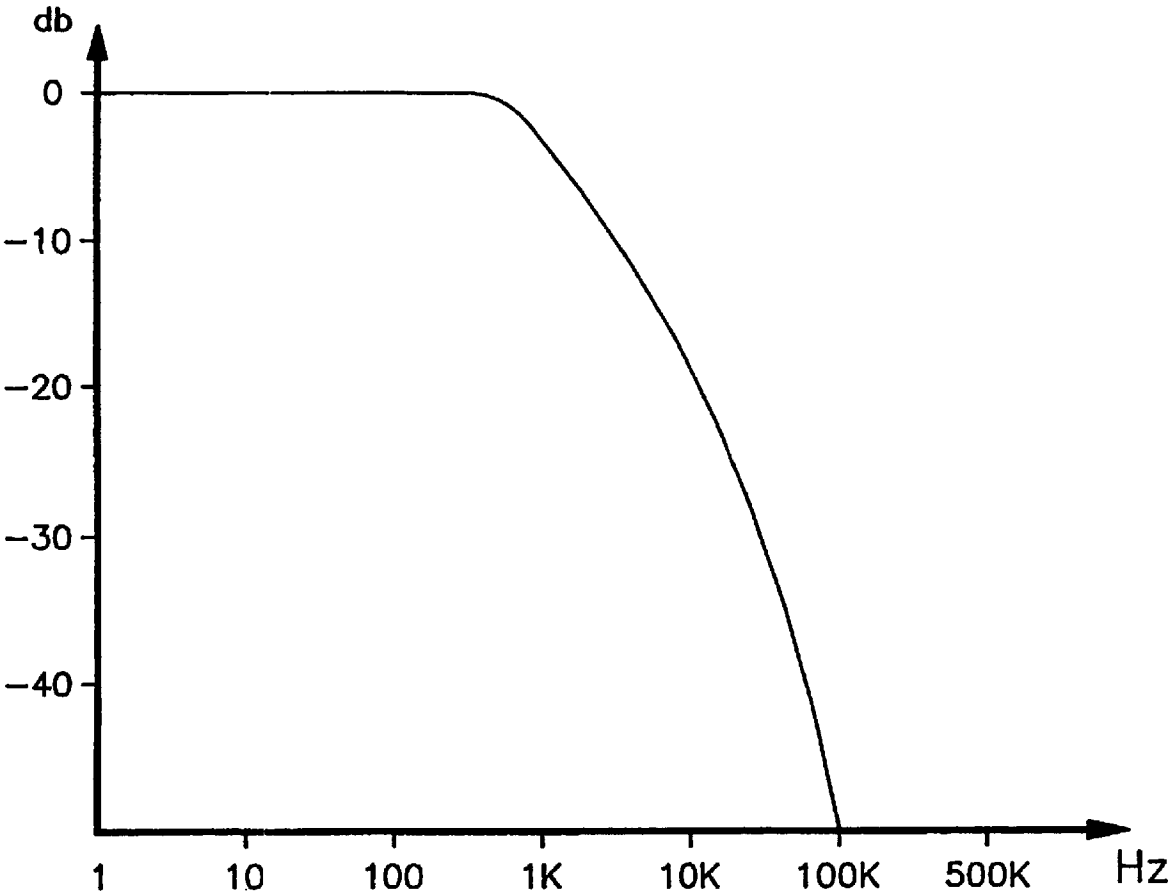
FIG. 6 shows a frequency response characteristic of a filter device of the synchronizing processing apparatus of FIG. 1.

This vertical filter circuitry employs a design [25] offsetting conventional optimal design. This design provides a frequency response characteristic without matching standard filter design curves which are commonly known. However, it is this design that provides a frequency response characteristic good for vertical synchronizing separation of the NTSC or HDTV video signal. This frequency response of the filter circuitry is shown in FIG. 6.

The filtered signal is applied to a positive input of a comparator CP19 via a 330Ω resistor *R51*. A resistor R46 of 3.3 [k] *K*Ω is bridged between the positive input and output of CP19 to provide positive feedback hysteresis for CP19. A positive 5 V voltage is tied to ground via resistors R47 and R48. R47 has resistance of 20 KΩ and R48 has resistance of 10 KΩ. A capacitor C16 of 0.1 μf is shunted across resistor R48, thereby providing a stable reference voltage to the negative input of CP19. Furthermore, a positive 5 V voltage is applied to the output of CP19 via a resistor R49 (1 KΩ). Filter circuitry provides a vertical synchronizing output $V_S$ via CP19 and inverted by an invertor 110.

To obtain a field synchronizing output, the vertical synchronizing output from CP19 is directed to a flip-flop 405. The clear input CLR and set input PR of 405 are coupled to a positive 5 V. The CK input of 405 receives vertical sync and the D input of 405 is coupled to H sync square waveform the $\overline{Q}$ output of multivibrator 404. The rising edges of the $V_S$ pulses activate the trigger 405 to produce the field synchronizing output $F_S$. Upon arrival of the rising edges, the Q output of 405 is set to such a level that is same as that at its D input. In addition, an invertor I11 is provided for outputting a reversed composite synchronizing output $\overline{C}_S$.

Figure 7:
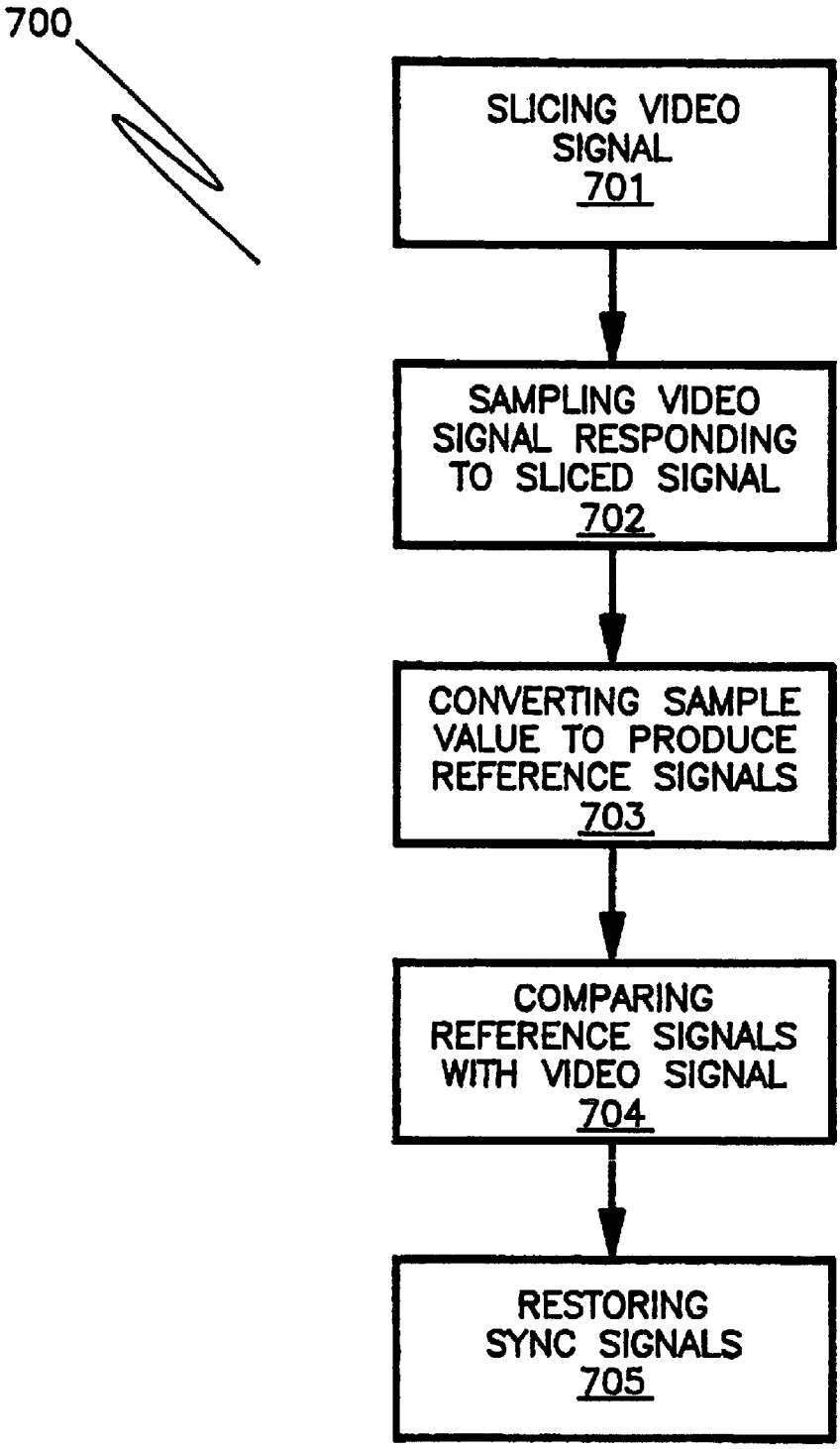
FIG. 7 is a flow chart of a synchronizing signal processing method in accordance with the present invention.
Figure 8:
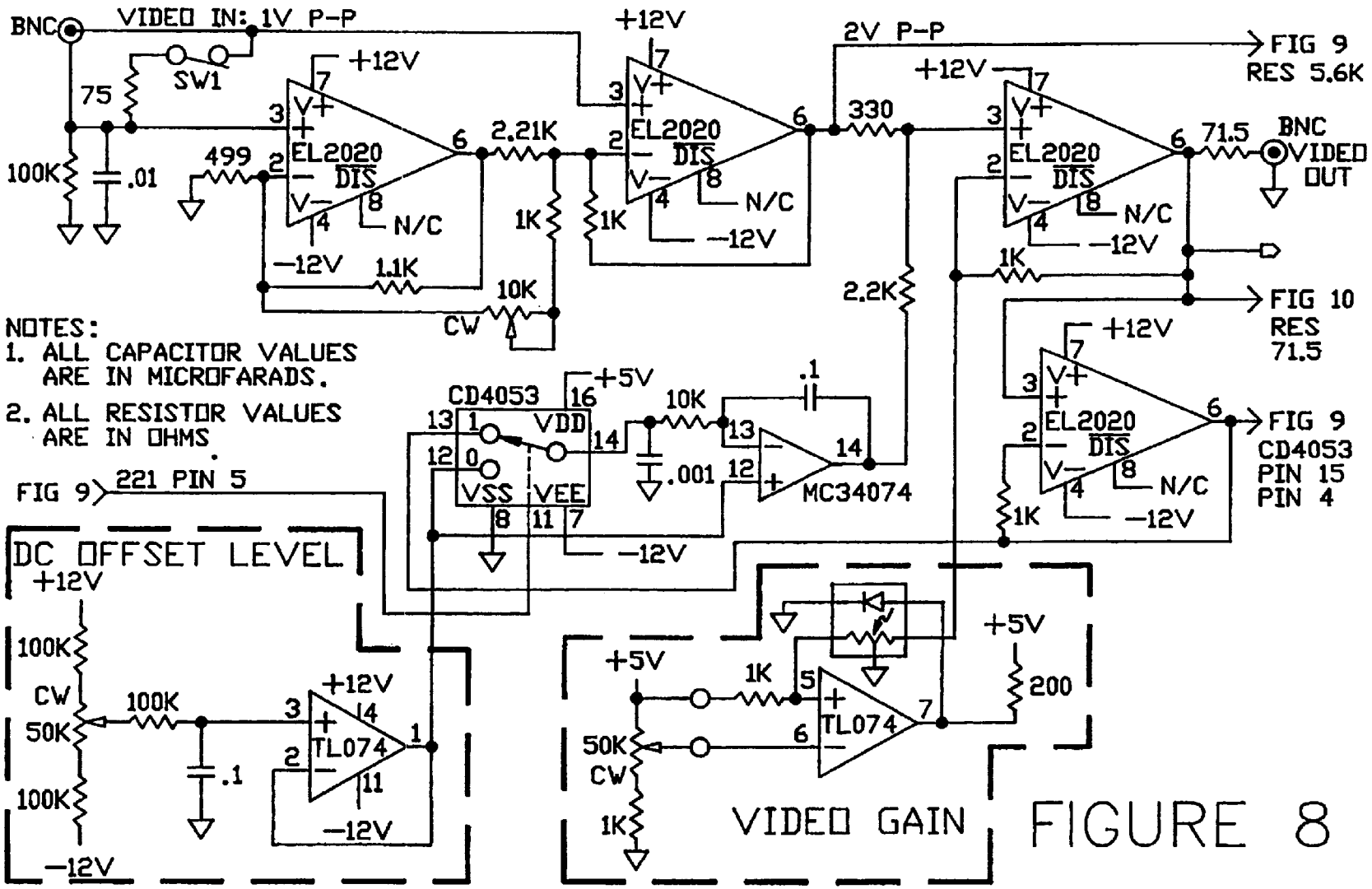
FIGS. 8–11 are four sheets of a detailed schematic of the preferred embodiment in accordance with the present invention.
Figure 9:
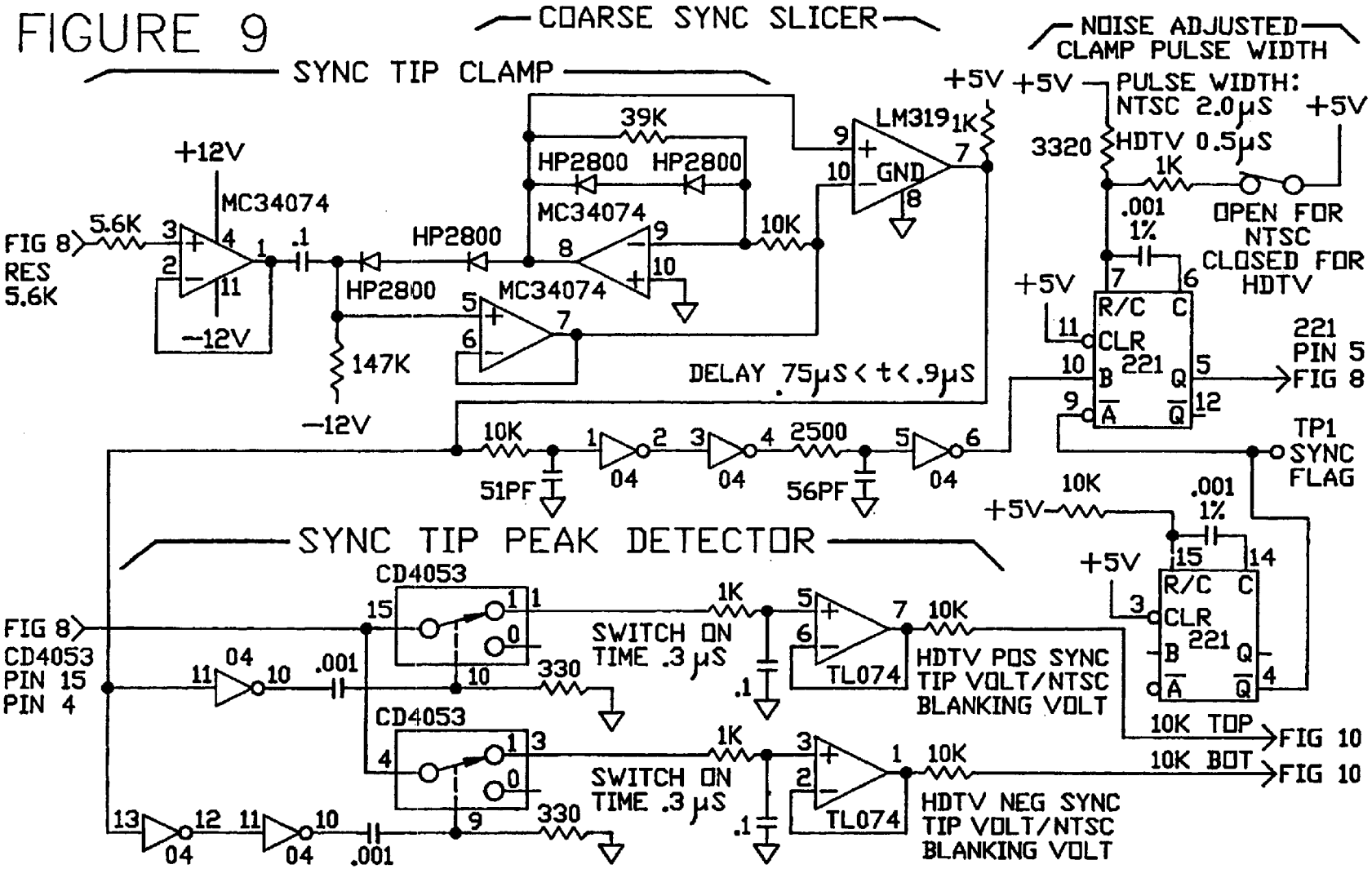
Figure 10:
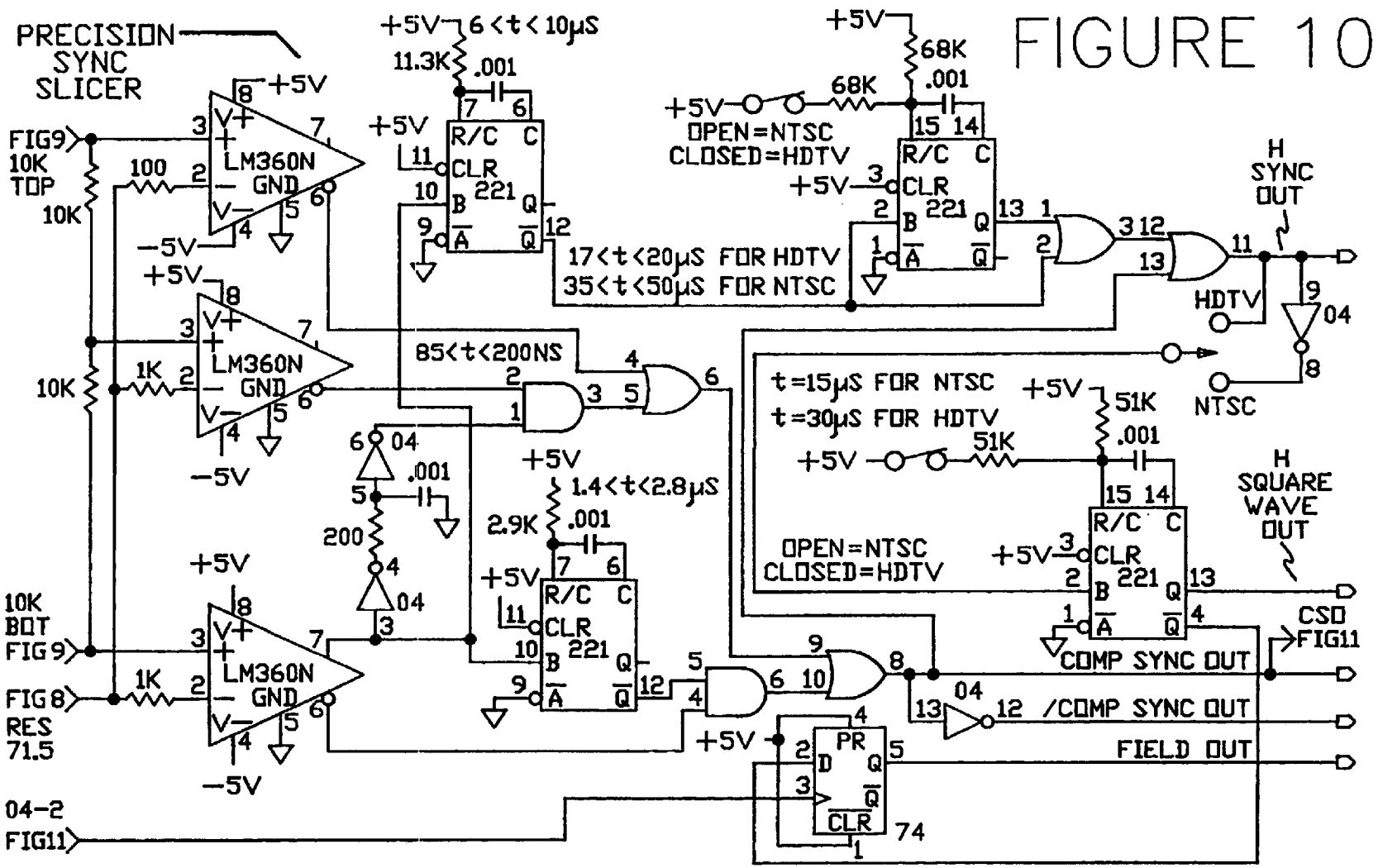
Figure 11:
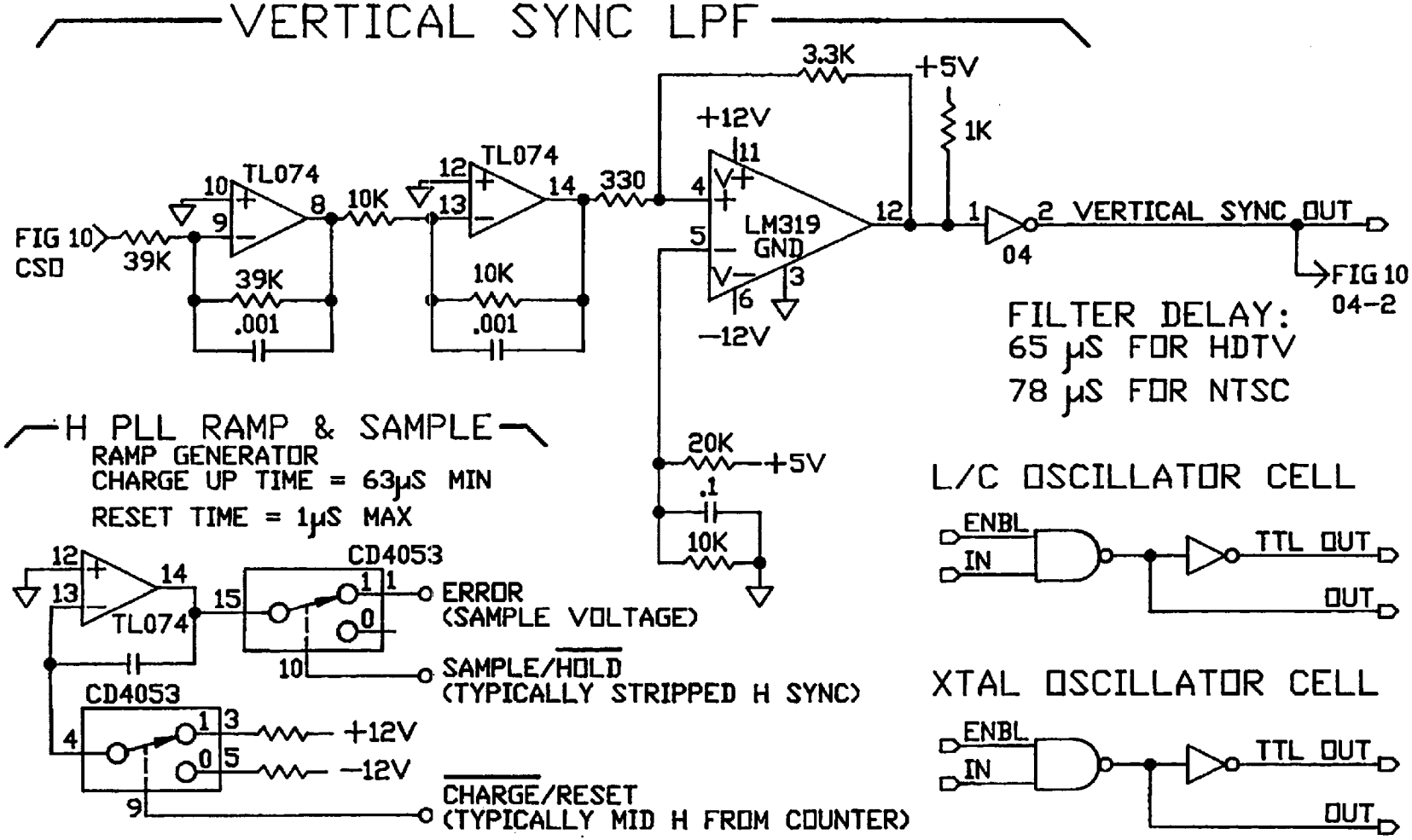

A processing method 700 for synchronizing pulses of the video signals is shown in FIG. 7. At step 701, the video signal is sliced to produce synchronizing pulses. The video signal is then sampled in response to the sliced sync to precisely sense the sync tip peaks pulses, at step 702, thereby providing two peak signal values representing the positive and negative peak values of each synchronizing pulse.

The peak signal values are further converted, at step 703, into three reference signals which respectively represent the different levels relative to each synchronizing pulse. In particular, the three reference levels respectively represent the middle, upper and lower middle levels of the synchronizing pulse. Comparison of the three reference levels and the video signal is conducted at step 704. As a result of this comparison, the logic pulse outputs are obtained. Step 705 is for restoring synchronizing pulses of the video signal by combining the logic outputs.

FIGS. 8–11 show a more detailed schematic circuit of a preferred embodiment in accordance with the present invention. All of the components in FIGS. 8–11 correspond directly to those presented in FIGS. 2–4. The differences between FIGS. 2–4 and 8–11 are that all of components in FIGS. 8–11 are marked with commercial identification and are therefore more available in market. Therefore, detailed product part numbers and nominal values of components are marked on the components of FIGS. 8–11. The operation principle and interconnection of the components of the circuitry shown in FIGS. 8–11 are corresponding to FIG. 1 and FIGS. 2–4 and one skilled in the art will be able to understand FIGS. 8–11 from the forgoing description and explanation. Thus, the description of FIGS. 8–11 is omitted here.

One skilled in the art will recognize that the above described functions and components are somewhat more complex than represented by the present block diagrams, however from the disclosure and teachings herein, taken with the available applications literature available from the manufacturers of the suggested components, or from other components which may be substituted as will be known from the above disclosure, the construction of a practical and operatable device will be well within the capability of one or ordinary skill in the art without resorting to further invention or undue experimentation.

It will be understood that the previous descriptions and explanations are given by way of example, and that numerous changes in the combinations of elements and functions as well as changes in design of the above may be made without departing from the spirit and scope of the invention as hereinafter claimed. In particular, it will be useful to combine the functions of the invention with other functions in a fashion so that such functions may be shared between devices or methods. These and other modification to and variations upon the embodiments described above are provided for by the present invention, the scope of which is limited only by the following claims.

What is claimed is:

1. A video signal processing apparatus for use with the synchronizing pulses thereof, said synchronizing pulses having at least a leading edge and a trailing edge including in combination:

at least one sampling circuit for sampling said synchronizing pulses in response to a plurality of sampling signals to generate at least a first reference signal and a second reference signal, said reference signals respectively representing different levels of said synchronizing pulses, wherein said sampling circuit includes DC restoring for restoring said synchronizing pulses to a predetermined DC reference level which said DC restored synchronizing pulses are coupled to at least one comparing circuit for comparing said video signal with a level responding to said reference signals thereby providing at least a precision sliced pulse signal, with said sampling being independent of said precision sliced pulse signal.

2. A video signal processing apparatus as recited in claim 1 wherein said sampling circuit further comprises:

a detecting circuit for detecting respective levels of said synchronizing pulses in response to said leading and trailing edges and outputting a first level signal and a second level signal; and converting circuit for converting said first and second level signals into said first and second reference signals.

3. A video signal processing apparatus as recited in claim 2 wherein said first reference signal represents a middle level value of said synchronizing pulse, said second reference signal represents a level value above said middle level value, said sampling means further generates a third reference signal representing a level value below said middle level value.

4. A video signal processing apparatus for use with synchronizing pulses of a video signal including:

at least one sampling circuit for sampling said synchronizing pulses in response to a plurality of sampling signals provided, in response to said synchronizing pulses to generate at least a first reference signal and a second reference signal, said reference signals respectively representing different levels of said synchronizing pulses; and comparing circuit for comparing said synchronizing pulses with a level responding to said reference signals to generate precision sliced pulses, with said sampling being independent of said precision sliced pulses, and further comprising combining said precision sliced pulses to generate horizontal rate and vertical rate pulse signals.

5. A video signal processing apparatus as recited in claim 4 wherein said combining comprises filtering for filtering one of said precision sliced pulse signals to generate said vertical rate pulse signal.

6. A synchronous signal processing apparatus for a video signal comprising:

slicing means for slicing said video signal to generate sliced pulses, said sliced pulses corresponding to respective synchronous pulses of said video signal, each of said sliced pulses having a leading edge and a trailing edge;

level detecting means for detecting respective levels of said synchronous pulses of said video signal in response to said leading and trailing edges and providing a first level signal in response to one of said edges and a second level signal in response to the other of said edges; and sync restoring means for detecting different levels of said synchronous pulses in response to said first and second level signals and generating a derived sync pulse output in response thereto.

7. A synchronous signal processing apparatus as recited in claim 6 wherein said sync restoring means comprises:

[transforming means] *a resistor divider circuit* for transforming said first and second level signals into a first reference signal, a second reference signal and a third reference signal; and comparing means for comparing said synchronous pulses with said first, second and third reference signals to generate logic level outputs.

8. A synchronous signal processing apparatus as recited in claim 7 wherein said sync restoring means further comprises means for filtering said derived sync pulse output to generate a vertical synchronous output.

9. A synchronous signal processing apparatus as recited in claim 8 wherein said filter means operates in response to a frequency ranging from 0–10 KHz.

10. A synchronous signal processing apparatus as recited in claim 6 further comprising format selecting means for selecting the format of said video signal being processed.

11. A synchronous signal processing apparatus as recited in claim 6 wherein said first and second level signals respectively represent a positive peak value and a negative peak value of said synchronous pulses.

12. A synchronous signal processing apparatus as recited in claim 8 wherein said filter means substantially operates to pass frequencies ranging from 0–1 KHz with less than 50% normalized amplitude attenuation, and having at least 90% normalized amplitude attenuation at frequencies greater than 10 KHz said normalized attenuations with respect to the level of DC response at the output.

13. A video signal processing apparatus, said video signal having synchronous pulses of a pulse amplitude, said apparatus comprising:

sync tip clamping means for clamping said video signal to provide a clamped pulse signal, respective pulse of said clamped pulse signal having a leading edge and a trailing edge;

peak detecting means for sampling said video signal in response to said leading and trailing edges to generate a positive peak signal and a negative peak signal;

level dividing means for dividing level between said positive and negative peak signals into a first reference level, a second reference level and a third reference level; and comparing means for comparing said video signal with respective said reference levels to generate logic level outputs.

14. A video signal processing apparatus as recited in claim 13 wherein said first reference level represents a mean value of said pulse amplitude, said second reference level represents a upper value and said third reference level represents a lower value.

15. A video signal processing apparatus as recited in claim 14 wherein said upper value is a sum of said mean value and an offset value, said lower value is a difference of said mean value and said offset value.

16. A video signal processing apparatus as recited in claim 15 wherein said offset value is one half of the value between said mean value and said positive peak.

17. A video signal processing apparatus, said video signal having synchronous pulses of a pulse amplitude, said apparatus comprising:

format selecting means responsive to the format of said video signal for determining the format of said video signal being processed;

sync tip clamping means for clamping respective sync tips of said video signal to provide a clamped pulse signal corresponding to said synchronous pulses, each respective pulse of said clamped pulse signal having a leading edge and a trailing edge;

sync slicing means coupling to said sync tip clamping means, for limiting an amplitude of said clamped pulse signal to provide a coarse sliced sync signal;

peak detecting means for sampling positive and negative peaks respectively of said synchronous pulses of said video signal in response to said leading and trailing edges, thereby generating a positive peak signal and a negative peak signal;

level dividing means for dividing level between said positive and negative peak signals into a first reference level, a second reference level and a third reference level, said first, second and third reference levels respectively representing different portion levels of said pulse amplitude;

comparing means for comparing said video signal with respective said reference levels to generate logic level outputs; and restoring means coupling to said comparing means, for combining said logic level outputs to generate a plurality of precision synchronous outputs.

18. A video signal processing apparatus as recited in claim 17 wherein said first reference level represents a mean value of said pulse amplitude, said second reference level represents a level value above said mean value and said third reference level represents a value below said mean value.

19. A method for processing a synchronous signal of a video signal comprising steps of:

slicing said video signal to generate a sliced sync pulse signal;

sampling said video signal in response to respective leading edges and trailing edges of said sliced pulse signal so as to generate a first sample level signal and a second sample level signal; converting said first and second sample level signals into a first reference signal, a second reference signal and a third reference signal, said first reference signal representing a middle level of each synchronous pulse of said video signal, said second reference signal representing a upper level above said middle level and said third reference signal representing a lower level below said middle level;

comparing said respective reference signals with said video signal to generate logic level outputs; and restoring desired synchronous pulses in response to said logic level outputs.

20. A [video signal processing apparatus] *method* as recited in claim 19 wherein said method further comprises a step of adjusting a pulse width of said sliced sync pulse signal in response to a format selecting signal generated by a mode selecting switch.

21. A method of generating an output sync signal corresponding to the sync portion of a composite video signal which sync portion comprises a plurality of sync levels, one of which said sync levels includes blanking level, said method including the steps of:

a. generating a plurality of level signals having magnitudes responsive to said sync levels, b. establishing at least one reference level between each of said sync levels in response to said level signals, the number thereof changeable in response to the number of said sync levels, c. for each said reference level established, generating a binary pulse version of said sync portion by comparison of said reference levels and said sync portion, d. generating said output sync signal in response to said binary pulse versions of step c.

22. A method of generating an output sync signal corresponding to the sync portion of a composite video signal which sync portion comprises a plurality of sync tip levels and a blanking level, said method including:

a. generating a plurality of level signals having magnitudes responsive to said sync tip levels, b. establishing a plurality of reference levels between said sync tip levels in response to said level signals, c. generating a plurality of binary pulse versions of said sync portion by comparison of said reference levels and said sync portion, d. combining said plurality of binary pulse versions to generate said output sync signal.

23. A method as claimed in claim 21 or 22 wherein said sync portion takes on three or more levels including the blanking level and two or more reference levels are established such that their values lie substantially equidistant from the outer level signals.

24. A method as claimed in claim 21 or 22 wherein, said comparison of said reference levels and said sync portion provides time sequential binary pulse versions as said sync portion transcends said reference levels.

25. A method as claimed in claim 21 or 22 wherein said binary pulse versions are time sequential and are combined so that a first edge of said output sync signal occurs in response to a first said binary pulse version, and a second edge of said output sync signal occurs in response to a second said binary pulse version.

26. A method as claimed in claim 21 or 22 including the step of determining if said composite video signal is a HDTV type video signal, and modifying said reference levels in response thereto.

27. An apparatus for deriving a logic level version of the sync portion of a video type signal, said sync portion having a plurality of levels, one of which may be a blanking level, said apparatus including:

circuitry responsive to said sync portion to clamp the sync tip thereof to a known level thereby providing a clamped sync portion and to generate at least a first logic level sync signal in response to said clamped sync portion;

circuitry for clamping said sync portion to a known level to provide a second clamped sync portion;

circuitry for providing at least one reference signal in response to said first logic level sync signal and said second clamped sync portion;

circuitry for comparing said second clamped sync portion to said reference signal to provide said logic level version.

28. An apparatus as claimed in claim 27 wherein in said circuitry for clamping the sync tip to a known level, said known level is established by one or more semiconductor junction voltage drops.

29. An apparatus as claimed in claim 27 or 28 wherein one said reference signal is responsive to the level of the blanking level of said second clamped sync portion.

30. An apparatus as claimed in claim 27 or 28 wherein one said reference signal is responsive to the sync tip level of said second clamped sync portion.

31. An apparatus for deriving a logic level version of the sync portion of a video type signal, said sync portion having a number of levels N, one of which may be a blanking level, and where N may be two or more depending on the format of said video type signal, said apparatus including:

circuitry to provide a format signal changeable in response to the format of said video type signal;

circuitry responsive to said sync portion to generate at least a first separated sync signal;

circuitry for providing at least N−1 reference signal(s) in response to said sync portion and said first separated sync signal; and circuitry responsive to said sync portion and said format signal and said reference signal(s) for comparing said sync portion to said reference signal(s) to provide said logic level version.

32. An apparatus as claimed in claim 31 wherein one said reference signal is responsive to the level of said sync portion which has the level closest to the peak white value of said video type signal.

33. An apparatus as claimed in claim 31 wherein said circuitry to provide a format signal is responsive to said video type signal to change said format signal in response thereto.

34. An apparatus as claimed in claim 31, 32 or 33 wherein N is two for NTSC or PAL type video signals and N is 3 for HDTV type video signals and where one said reference signal is provided for NTSC or PAL type video signals and at least two said reference signals are provided for HDTV type video signals, each *of* which reference signals [are] *is* responsive to at least one sync portion level.

35. A video sync pulse circuit responsive to composite sync pulses which may be part of a composite video signal said circuit operative to provide a reference voltage corresponding to the 50% level of sync, including in combination:

a) a coupling capacitor coupled to an input terminal to AC couple said composite sync pulses to a sync tip clamp circuit, said sync tip clamp circuit including a source of current operative to charge said coupling capacitor in a first direction and further including circuitry to charge said coupling capacitor in the opposite direction during at least a portion of the time said AC coupled sync tips surpass a reference, said charging action thus providing sync tip clamping to provide a sync tip clamped signal;

b) a buffer, responsive to said sync tip clamped signal to buffer same to provide a buffered signal;

c) a comparator responsive to said buffered signal and a reference to provide a compared sync signal;

d) a plurality of pulse circuits responsive to said compared sync signal from said comparator to provide a first sample and hold pulse in response to the leading edge of said compared sync signal and a second sample and hold pulse in response to the trailing edge of said compared sync signal;

e) a first sample and hold circuit responsive to said first sample and hold pulse and a DC restored form of said composite sync pulses to sample and hold the voltage level of sync tip;

f) a second sample and hold circuit responsive to said second sample and hold pulse and blanking level of said DC restored form of said composite sync pulses to sample and hold the voltage level of blanking;

g) a divider circuit responsive to the held voltage of sync tip and the held voltage of blanking to provide an in between voltage which is said reference voltage;

wherein circuitry used to accomplish one of elements a) through g) may be shared between two or more elements.

36. A video sync pulse [separator] *separator* circuit responsive to a composite video signal for providing horizontal and vertical sync pulses including in combination:

a) a coupling capacitor to AC couple said composite video signal to a sync tip clamp circuit, said sync tip clamp circuit including a source of current operative to charge said coupling capacitor in a first direction and further including circuitry to charge said coupling capacitor in the opposite direction during at least a portion of the time any AC coupled sync tip surpasses a reference, said charging action thus sync tip clamping to provide a sync tip clamped signal;

b) a buffer responsive to said sync tip clamped video signal to buffer said sync tip clamped video to provide a buffered signal;

c) a comparator responsive to said buffered signal and a reference to provide a compared sync signal;

d) a plurality of pulse circuits responsive to said compared sync signal from said comparator to provide a first sample and hold pulse in response to the leading edge of said compared sync signal and a second sample and hold pulse in response to the trailing edge of said compared sync signal;

e) a first sample and hold circuit responsive to said first sample and hold pulse and sync tip of a DC restored form of said composite video signal to sample and hold the voltage level of sync tip;

f) a second sample and hold circuit responsive to said second sample and hold pulse and blanking level of said DC restored form of said composite video signal to sample and hold the voltage level of blanking;

g) a divider circuit responsive to the held voltage of sync tip and the held voltage of blanking to provide an in between reference voltage;

h) a further comparator responsive to said reference voltage and comparison video to provide reference sync pulses, said comparison video being a version of said composite video signal of element a) having a known DC level;

i) a half horizontal pulse eliminator circuit responsive to said reference sync pulses to output horizontal rate pulses;

j) a vertical synchronizing filter circuit responsive to said reference sync pulses to output a vertical rate pulse;

k) a field synchronizing circuit responsive to at least circuit element j) and to the relationship of horizontal sync pulses and the leading edge of vertical sync to output a field synchronizing pulse signifying odd and even fields, wherein circuitry used to accomplish one of elements a) through k) may be shared between a plurality of elements.

37. The video sync pulse circuit of claim 35 or 36 wherein element b) includes amplification, in element e) said first sample and hold pulse is delayed with respect to the leading edge of sync tip to allow said first sample and hold pulse to start within said sync tip and in element c) said buffered signal has reduced high frequency components as compared to said sync tip clamped signal of a).

38. The video sync pulse circuit of claim 35 or 36 wherein said comparator of element c) includes adjustment of the magnitude of the difference between said buffered signal and said reference value which adjustment is made in relation to the sync level of said buffered video to provide a reduction in comparator sensitivity to noise.

39. A method for processing a sync portion of a video type signal, said sync portion having a plurality of levels, comprising steps to:

a) a first separation of said sync portion to generate a first separated sync signal, including clamping the sync tip of said sync portion to a known level before said first separation;

b) generating a plurality of level signals each being representative of a level of a second clamping of said sync portion, at least one of said level signals is also generated in response to said first separated sync signal;

c) providing a reference signal in response to said plurality of level signals;

d) a second separation of said second clamped sync portion in response to said reference signal to provide a second separated sync signal which is a version of said sync portion.

40. A method for processing a sync portion of a video type signal, said sync portion having a plurality of levels, comprising steps to:

a) a first separation of said sync portion to generate a first separated sync signal, including clamping the sync tip of said sync portion to a known level established by one or more semiconductor junction voltage drops before said first separation;

b) generating a plurality of level signals each being representative of a level of a second clamping of said sync portion, at least one of said level signals is also generated in response to said first separated sync signal;

c) providing a reference signal in response to said plurality of level signals;

d) a second separation of said second clamped sync portion in response to said reference signal to provide a second separated sync signal which is a version of said sync portion.

41. A method as claimed in claim 39 or 40 wherein said step b) includes establishing one level of said sync portion at a known level in response to said first separated sync signal before said generating and with step d) performed on said second clamped sync portion having one level established of step b).

*42. The video signal processing apparatus of claim 1, wherein the DC restoring includes a current, and*

*wherein the current varies in amount and polarity.*

*43. The method of claim 21, comprising the step of:*

*e.) clamping the composite video signal,*

*wherein step (e) utilizes a current,*

*wherein the current varies in amount and polarity, and*

*wherein step (a) is performed in response to step (e).*

*44. The method of claim 21, wherein in step (b) a plurality of reference levels are established,*

*wherein a first reference level value lies substantially equidistant from outer level signals, and*

*wherein a second reference level value lies substantially one quarter of the distance from one of the outer level signals.*

*45. The method of claim 21, wherein in step (b) at least three reference levels are established,*

*wherein a first reference level value lies substantially equidistant from outer level signals,*

*wherein a second reference level value lies substantially one quarter of the distance from a first of the outer level signals, and*

*wherein a third reference level value lies substantially three quarters of the distance from the first of the outer level signals.*

*46. The method of claim 21, wherein in step (b) a plurality of reference levels are established between the lower sync tip and blanking levels,*

*wherein a first reference level value comprises a voltage of substantially half-way between sync tip and blanking levels, and*

*wherein a second reference level value comprises a voltage of substantially half-way between the half-way level and blanking level.*

*47. The method of claim 21, wherein in step (b) a plurality of reference levels are established between the lower sync tip and blanking levels,*

*wherein a first reference level value comprises a voltage of substantially half-way between sync tip and blanking levels, and*

*wherein a second reference level value comprises a voltage of substantially half-way between the half way level and sync tip level.*

*48. The method of claim 21, comprising to step of:*

*e.) clamping the composite video signal to a known level before step (a),*

*wherein step (e) includes the steps of:*

*f.) comparing the composite video signal to the known level; and*

*g.) selectively injecting a current into a coupling capacitor carrying the composite video signal,*

*wherein the amount of the current is responsive to the difference between the composite video signal and the known level.*

*49. The method of claim 22, comprising the step of:*

*e.) clamping the composite video signal,*

*wherein step (e) utilizes a current,*

*wherein the current varies in amount and polarity, and*

*wherein step (a) is performed in response to step (e).*

*50. The apparatus of claim 27, wherein the clamping circuitry utilizes a current, and*

*wherein the current varies in amount and polarity.*

*51. The apparatus as claimed in claim 28, wherein said known level is established by one semiconductor junction voltage drop.*

*52. The apparatus as claimed in claim 28, wherein said known level is established by a plurality of semiconductor junction voltage drops.*

*53. The apparatus of claim 31, comprising:*

*circuitry operable to clamp the video type signal to a known level by use of a current, the current having a variable amount and changing polarity, and*

*wherein the current is responsive to the video type signal and the known level.*

*54. The apparatus of claim 31, wherein N=2.*

*55. The apparatus of claim 31, wherein N=3.*

*56. The apparatus of claim 31, wherein the format signal is changed manually.*

*57. The apparatus of claim 31, wherein the format signal is changed automatically.*

*58. The video sync pulse circuit of claim 35, wherein the circuitry to charge the coupling capacitor provides a variable current, and*

*wherein the variable current is capable of changing polarity.*

*59. The video sync pulse circuit of claim 35, wherein the reference voltage is substantially 50% of the sync tip and blanking voltage levels.*

*60. The video sync pulse separator circuit of claim 36, wherein the circuitry to charge the coupling capacitor provides a variable current, and*

*wherein the variable current is capable of changing polarity.*

*61. The method of claim 39, wherein the clamping of step (a) uses a variable current, and*

*wherein the variable current is capable of changing polarity.*

*62. The method as claimed in claim 40, wherein said known level is established by one semiconductor junction voltage drop.*

*63. The method as claimed in claim 40, wherein said known level is established by a plurality of semiconductor junction voltage drops.*

*64. The method of claim 40, wherein the second clamping of step (b) uses a variable current, and*

*wherein the variable current is capable of changing polarity.*

*65. A video signal processing apparatus, wherein a video signal includes synchronous pulses of a pulse amplitude, comprising:*

*a sync tip clamping device for clamping the video signal to provide a clamped pulse signal,*

*wherein the sync tip clamping device includes a current,*

*wherein the current varies in amount and polarity, and*

*wherein a respective pulse of the clamped pulse signal includes a leading edge and a trailing edge;*

*a peak detecting device for sampling the video signal in response to the leading and trailing edges to generate a positive peak signal and a negative peak signal;*

*a level dividing device for dividing levels between the positive and negative peak signals into a first reference level, a second reference level and a third reference level; and*

*a comparing device for comparing the video signal with respective reference levels to generate logic level outputs.*

*66. A video signal processing apparatus, wherein a video signal includes synchronous pulses of a pulse amplitude, comprising:*

*a format selecting device responsive to a format of the video signal for determining the format of the video signal being processed;*

*a sync tip clamping device for clamping respective sync tips of the video signal to provide a clamped pulse signal corresponding to the synchronous pulses,*

*wherein the sync tip clamping device includes a current,*

*wherein the current varies in amount and polarity, and*

*wherein each respective pulse of the clamped pulse signal includes a leading edge and a trailing edge;*

*a sync slicing device, coupled to the sync tip clamping device, for limiting an amplitude of the clamped pulse signal to provide a coarse sliced sync signal;*

*a peak detecting device for sampling positive and negative peaks respectively of the synchronous pulses of the video signal in response to the leading and trailing edges to generate a positive peak signal and a negative peak signal;*

*a level dividing device for dividing levels between the positive and negative peak signals into a first reference level, a second reference level and a third reference level,*

*wherein the first, second and third reference levels respectively represent different portion levels of the pulse amplitude;*

*a comparing device for comparing the video signal with respective reference levels to generate logic level outputs; and*

*a restoring device, coupled to the comparing device, for combining the logic level outputs to generate a plurality of precision synchronous outputs.*

*67. A method of generating an output sync signal corresponding to a sync portion of a composite video signal, wherein the sync portion comprises a plurality of sync tip levels and a blanking level, the method comprising the steps of:*

*a.) generating a plurality of level signals having magnitudes responsive to the sync tip levels,*

*wherein at least one of the level signals is held on a first capacitor;*

*b.) establishing a plurality of reference levels between the sync tip levels in response to the level signals;*

*c.) generating a plurality of binary pulse versions of the sync portion by comparison of the reference levels and the sync portion; and*

*d.) combining the plurality of binary pulse versions to generate an output sync signal.*

*68. The method of claim 67, comprising the steps of:*

*e.) sampling a first of the sync tip levels and holding a first sample value on the first capacitor; and*

*f.) sampling a second of the sync tip levels and holding a second sample value on a second capacitor.*

*69. The method claim 67, wherein in step (b) a first reference level is at substantially a midpoint between the sync tip levels.*

*70. The method of claim 67, wherein in step (b) a first reference level is at substantially a midpoint between one sync tip level and blanking level.*

*71. The method of claim 67, wherein in step (b) a first reference level is at substantially a midpoint between the sync tip levels, and*

*wherein a second reference level is at substantially a midpoint between one sync tip level and blanking level.*

*72. The method of claim 67, wherein in step (b) a first reference level is at substantially a midpoint between the sync tip levels,*

*wherein a second reference level is at substantially a midpoint between a first sync tip level and blanking level, and*

*wherein a third reference level is at substantially a midpoint between a second sync tip level and blanking level.*

* * * * *